United States Patent
Hendry et al.

(10) Patent No.: US 11,803,854 B1
(45) Date of Patent: *Oct. 31, 2023

(54) SYSTEM AND METHOD FOR FRAUD DETECTION USING EVENT DRIVEN ARCHITECTURE

(71) Applicant: UIPCO, LLC, San Antonio, TX (US)

(72) Inventors: Jason Paul Hendry, Selma, TX (US); Rodney Kalich, Shiner, TX (US); Randall Martin Brandt, Dallas, TX (US); Marco Aldo Jimenez, San Antonio, TX (US); David Perry, San Antonio, TX (US)

(73) Assignee: United Services Automobile Association (USAA), San Antonio, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/652,299

(22) Filed: Feb. 24, 2022

Related U.S. Application Data

(63) Continuation of application No. 16/428,785, filed on May 31, 2019, now Pat. No. 11,315,119.

(51) Int. Cl.
 *G06Q 20/40* (2012.01)
 *G06Q 40/02* (2023.01)
(52) U.S. Cl.
 CPC ....... *G06Q 20/4016* (2013.01); *G06Q 20/403* (2013.01); *G06Q 20/405* (2013.01); *G06Q 40/02* (2013.01)
(58) Field of Classification Search
 None
 See application file for complete search history.

(56) References Cited

U.S. PATENT DOCUMENTS

| | | |
|---|---|---|
| 7,437,330 B1 | 10/2008 | Robinson |
| 7,899,750 B1 | 3/2011 | Klieman |
| 7,970,669 B1 | 6/2011 | Santos |
| 8,073,759 B1 | 12/2011 | Del Favero |
| 8,073,772 B2 | 12/2011 | Bishop |
| 8,260,699 B2 | 9/2012 | Smith |
| 8,489,476 B1 | 7/2013 | Lester |
| 8,554,647 B1 | 10/2013 | Grigg |
| 8,571,982 B2 | 10/2013 | Choudhuri |

(Continued)

OTHER PUBLICATIONS

Non-Final Office Action dated May 18, 2021 for U.S. Appl. No. 16/428,785.

(Continued)

*Primary Examiner* — Bruce I Ebersman
*Assistant Examiner* — Matthew Cobb
(74) *Attorney, Agent, or Firm* — Plumsea Law Group, LLC

(57) ABSTRACT

A system and method of providing real time account information for financial accounts is disclosed. The system includes an event based architecture including an event stream. Financial transaction processing systems publish transaction events to the event stream. A transaction service listening to the event stream detects new transaction events. The transaction service takes action to enrich transaction data. A middleware system reconciles existing transactions and persists transaction records in long term storage. The system can detect fraudulent transactions before the transactions have been posted to the financial account. The system can also be used to provide real time notifications to customers about potential fraudulent activity.

20 Claims, 41 Drawing Sheets

(56) References Cited

U.S. PATENT DOCUMENTS

| | | |
|---|---|---|
| 8,639,622 B1 | 1/2014 | Moore |
| 8,666,855 B2 | 3/2014 | Armes |
| 8,706,587 B1 | 4/2014 | Bautista, Jr. |
| 8,751,375 B2 | 6/2014 | Smith |
| 9,767,503 B2 | 9/2017 | Grigg |
| 10,346,844 B2 | 7/2019 | Chisholm |
| 10,853,855 B2 | 12/2020 | John |
| 2002/0087552 A1 | 7/2002 | Applewhite |
| 2002/0173986 A1 | 11/2002 | Lehew |
| 2004/0267662 A1 | 12/2004 | Armes |
| 2009/0299841 A1 | 12/2009 | Bishop |
| 2010/0125470 A1 | 5/2010 | Chisholm |
| 2011/0005852 A1 | 3/2011 | Smith |
| 2012/0197773 A1 | 8/2012 | Grigg |
| 2013/0024361 A1 | 1/2013 | Choudhuri |
| 2013/0024376 A1 | 1/2013 | Choudhuri |
| 2013/0024375 A1 | 2/2013 | Choudhuri |
| 2016/0086185 A1* | 3/2016 | Adjaoute ........... G06Q 20/4016 705/44 |
| 2017/0124571 A1* | 5/2017 | John ..................... G06Q 20/40 |
| 2018/0053114 A1* | 2/2018 | Adjaoute ............... G06N 20/00 |
| 2018/0137506 A1 | 5/2018 | Kcl |
| 2018/0267418 A1 | 9/2018 | Tanksali |
| 2018/0268418 A1 | 9/2018 | Tanksali |
| 2019/0080328 A1 | 3/2019 | Gospodinov |
| 2019/0180258 A1 | 6/2019 | Amar |
| 2020/0311724 A1 | 10/2020 | Dunjic |

OTHER PUBLICATIONS

Non-Final Office Action dated May 3, 2021 for U.S. Appl. No. 16/428,798.
Non-Final Office Action dated Mar. 31, 2021 for U.S. Appl. No. 16/428,775.
Notice of Allowance dated Nov. 29, 2021 for U.S. Appl. No. 16/428,785.
Wang, et al., in "Deeper: A Data Enrichment System Powered by Deep Web," in ACM, in 2018 (Year: 2018).
Notice of Allowance dated Nov. 29, 2021 for U.S. Appl. No. 16/428,798.
Non-Final Office Action dated Sep. 7, 2022 for U.S. Appl. No. 17/652,298.
Non-Final Office Action dated Nov. 3, 2022 for U.S. Appl. No. 17/652,298.
Non-Final Office Action dated Feb. 3, 2023 for U.S. Appl. No. 17/652,298.
Notice of Allowance dated Dec. 7, 2022 for U.S. Appl. No. 16/428,775.
Final Office Action dated Aug. 30, 2021 for U.S. Appl. No. 16/428,775.
Final Office Action mailed Aug. 30, 2021 for U.S. Appl. No. 16/428,775.
Non-Final Office Action dated Mar. 29, 2022 for U.S. Appl. No. 16/428,775.

* cited by examiner

| | EVENT DEFINITION | DOMAIN |
|---|---|---|
| 801 | TO ACCOUNT | N/A |
| 802 | TO ACCOUNT ROUTING NUMBER | BANK FSB OR USB ROUTING NUMBER |
| 803 | TO ACCOUNT TYPE | CHK, SAV, CC BRK, MF |
| 804 | FROM ACCOUNT | N/A |
| 805 | FROM ACCOUNT ROUTING NUMBER | BANK FSB OR USB ROUTING NUMBER |
| 806 | FROM ACCOUNT TYPE | CHK, SAV, CC BRK, MF |
| 807 | AMOUNT | CURRENCY |
| 808 | SCHEDULED ON | Date/TS MM/DD/YYYY TT:TT:TT:SSSSS |
| 809 | SCHEDULED FOR | Date/TS MM/DD/YYYY TT:TT:TT:SSSSS |
| 810 | SUBMITTED BY | SIGNATORY, PRIMARY, SECONDARY |
| 811 | REQUESTED BY | SIGNATORY, PRIMARY, SECONDARY |
| 812 | ORIGINATED BY | PRIMARY, SIGNATORY ON THE BEHALF OF PRIMARY, MSR ON THE BEHALF OF (PRIMARY, SECONDARY, SIGNATURE) |
| 813 | MEMO FIELD - | (FUNDS TRANSFER AND BILL PAY) |
| 814 | SOURCE SYSTEM CONFIRMATION ID | -78945 |
| 815 | SOURCE SYSTEM GENERATED ID - | 456789 - Sub System ID |
| 816 | SOURCE - | FIDELITY, ZELLE, OTHER, IMM |
| 817 | TYPE | (MANUAL, AUTH, AA SCHEDULED ONE TIME, REOCCURRING) |
| 818 | CHANNEL - | WEB, MOBILE, MSR, VOICE, SYSTEM |
| 819 | STATUS - | (PENDING, POSTED) |
| 820 | POSTED DATE | Date/TS MM/DD/YYYY TT:TT:TT:SSSSS |
| 821 | SETTLEMENT DATE | Date/TS MM/DD/YYYY TT:TT:TT:SSSSS |
| 822 | TIME TO LIVE | Date/TS MM/DD/YYYY TT:TT:TT:SSSSS |
| 823 | TIME TO DISPLAY | Date/TS MM/DD/YYYY TT:TT:TT:SSSSS |
| 824 | TRANSACTION CODE | SYSTEM OF RECORD TRANSACTION CODE (201, 310, , 311, ETC) |
| 825 | OVERRIDE TRAN DESCRIPTION | OVERRIDE TRANSACTION DESCRIPTION |
| 826 | OVERRIDE CATEGORY | OVERRIDE OF CATEGORY |
| 827 | FREQUENCY TYPE | WEEKLY, BI-WEEKLY, DAILY, MONTHLY, QUARTERLY, BI-ANNUALLY, ANNUALLY |
| 828 | FREQUENCY DURATION | LENGTH BETWEEN EVENTS |
| 829 | FREQUENCY END DATE | DATE OR NULL (NO DATE MEANS IT DOES NOT END) |
| 830 | FREQUENCY ACTION | INDIVIDUAL, SERIES |

FIG. 8

| USE CASE | EVENT TYPE | ACTIVITY | ACTION | NOTES |
|---|---|---|---|---|
| MANUAL TRANSACTIONS | | | | |
| ADD NEW ONE TIME MANUAL PAYMENT | MANUAL | SCHEDULED | CREATE | PUBLISH EVENT FOR ONE TIME MANUAL PAYMENT USING A BANK ACCOUNT |
| UPDATE ONE TIME MANUAL PAYMENT | MANUAL | SCHEDULED | UPDATE | PUBLISH EVENT FOR ONE TIME MANUAL PAYMENT USING A BANK ACCOUNT |
| DELETE ONE TIME MANUAL PAYMENT | MANUAL | SCHEDULED | CANCEL | PUBLISH EVENT FOR ONE TIME MANUAL PAYMENT USING A BANK ACCOUNT |
| ENRICH ONE TIME MANUAL PAYMENT | MANUAL | SCHEDULED | ENRICHED | PUBLISH EVENT FOR ONE TIME MANUAL PAYMENT USING A BANK ACCOUNT |
| RECONCILE ONE TIME MANUAL PAYMENT | MANUAL | PROCESSED | COMPLETE EXPIRED | PUBLISH EVENT FOR ONE TIME MANUAL PAYMENT USING A BANK ACCOUNT |

FIG. 9

| USE CASE | EVENT TYPE | ACTIVITY | ACTION | NOTES |
|---|---|---|---|---|
| MANUAL TRANSACTIONS | | | | |
| ADD NEW RECURRING MANUAL | MANUAL | SCHEDULED | CREATE | PUBLISH EVENT FOR ONE TIME MANUAL PAYMENT USING A BANK ACCOUNT |
| UPDATE RECURRING MANUAL | MANUAL | SCHEDULED | UPDATE | PUBLISH EVENT FOR ONE TIME MANUAL PAYMENT USING A BANK ACCOUNT |
| DELETE RECURRING MANUAL | MANUAL | SCHEDULED | CANCEL | PUBLISH EVENT FOR ONE TIME MANUAL PAYMENT USING A BANK ACCOUNT |
| FORECAST RECURRING MANUAL | FORECAST | SCHEDULED | CREATE | PUBLISH EVENT FOR ONE TIME MANUAL PAYMENT USING A BANK ACCOUNT |
| UPDATE FORECAST RECURRING MANUAL | FORECAST | SCHEDULED | UPDATE | PUBLISH EVENT FOR ONE TIME MANUAL PAYMENT USING A BANK ACCOUNT |
| DELETE FORECAST RECURRING MANUAL | FORECAST | SCHEDULED | CANCEL | PUBLISH EVENT FOR ONE TIME MANUAL PAYMENT USING A BANK ACCOUNT |

| USE CASE | EVENT TYPE | ACTIVITY | ACTION | NOTES |
|---|---|---|---|---|
| RECURRING BANK TRANSFERS | | | | |
| ADD NEW RECURRING BANK TRANSFER | RECURRING PAYMENT | SCHEDULED | CREATE | PUBLISH EVENT FOR RECURRING BANK TRANSFER USING A BANK ACCOUNT |
| UPDATE RECURRING BANK TRANSFER | RECURRING PAYMENT | SCHEDULED | UPDATE | PUBLISH EVENT FOR RECURRING BANK TRANSFER USING A BANK ACCOUNT |
| DELETE RECURRING BANK TRANSFER | RECURRING PAYMENT | SCHEDULED | CANCEL | PUBLISH EVENT FOR RECURRING BANK TRANSFER USING A BANK ACCOUNT |
| RECONCILE RECURRING BANK TRANSFER | RECURRING PAYMENT | SCHEDULED | COMPLETE EXPIRED | PUBLISH EVENT FOR RECURRING BANK TRANSFER USING A BANK ACCOUNT |
| FORECAST RECURRING BANK TRANSFER | FORECAST | SCHEDULED | | PUBLISH EVENT FOR RECURRING BANK TRANSFER USING A BANK ACCOUNT (30 DAYS) |
| ADD NEW CREDIT CARD APP | RECURRING PAYMENT | SCHEDULED | CREATE | PUBLISH EVENT FOR CREDIT CARD AUTOMATIC PAYMENT USING A BANK ACCOUNT |
| UPDATE CREDIT CARD APP | RECURRING PAYMENT | SCHEDULED | UPDATE | PUBLISH EVENT FOR CREDIT CARD AUTOMATIC PAYMENT USING A BANK ACCOUNT |

FIG. 11

| USE CASE | EVENT TYPE | ACTIVITY | ACTION | NOTES |
|---|---|---|---|---|
| RECURRING BANK TRANSFERS | | | | |
| DELETE CREDIT CARD APP | RECURRING PAYMENT | SCHEDULED | CANCEL | PUBLISH EVENT FOR CREDIT CARD AUTOMATIC PAYMENT USING A BANK ACCOUNT |
| RECONCILE CREDIT CARD APP | RECONCILE | COMPLETE | COMPLETE EXPIRED | PUBLISH EVENT FOR CREDIT CARD AUTOMATIC PAYMENT USING A BANK ACCOUNT |
| ADD NEW P&C APP | RECURRING PAYMENT | SCHEDULED | CREATE | PUBLISH EVENT FOR P&C AUTOMATIC PAYMENT USING A BANK ACCOUNT |
| UPDATE P&C APP | RECURRING PAYMENT | SCHEDULED | UPDATE | PUBLISH EVENT FOR P&C AUTOMATIC PAYMENT USING A BANK ACCOUNT |
| DELETE P&C APP | RECURRING PAYMENT | SCHEDULED | CANCEL | PUBLISH EVENT FOR P&C AUTOMATIC PAYMENT USING A BANK ACCOUNT |
| RECONCILE P&C APP | RECURRING PAYMENT | COMPLETE | COMPLETE EXPIRED | PUBLISH EVENT FOR P&C AUTOMATIC PAYMENT USING A BANK ACCOUNT |
| UPDATE CREDIT CARD APP | RECURRING PAYMENT | SCHEDULED | UPDATE | PUBLISH EVENT FOR LOAN AUTOMATIC PAYMENT USING A BANK ACCOUNT |

FIG. 12

| USE CASE | EVENT TYPE | ACTIVITY | ACTION | NOTES |
|---|---|---|---|---|
| ONE TIME SCHEDULED | | | | |
| ADD NEW ONE TIME SCHEDULED PAYMENT | ONE TIME PAYMENT | SCHEDULED | CREATE | PUBLISH EVENT FOR ONE TIME FUNDS TRANSFERS AND ONE TIME P&C, CREDIT CARD, LIFE, LOAN AND HELOC PAYMENTS USING A BANK ACCOUNT |
| UPDATE ONE TIME SCHEDULED PAYMENT | ONE TIME PAYMENT | SCHEDULED | UPDATE | PUBLISH EVENT FOR ONE TIME FUNDS TRANSFERS AND ONE TIME P&C, CREDIT CARD, LIFE, LOAN AND HELOC PAYMENTS USING A BANK ACCOUNT |
| DELETE ONE TIME SCHEDULED PAYMENT | ONE TIME PAYMENT | SCHEDULED | CANCEL | PUBLISH EVENT FOR ONE TIME FUNDS TRANSFERS AND ONE TIME P&C, CREDIT CARD, LIFE, LOAN AND HELOC PAYMENTS USING A BANK ACCOUNT |
| EXECUTE ONE TIME PAYMENT | ONE TIME PAYMENT | PENDING | PENDING FAILED UNKNOWN | PUBLISH EVENT FOR ONE TIME (SCHEDULED OR IMMEDIATE) FUNDS TRANSFERS AND ONE TIME P&C, CREDIT CARD, LIFE, LOAN AND HELOC PAYMENTS USING A BANK ACCOUNT |
| ENRICH ONE TIME SCHEDULED PAYMENT | ONE TIME PAYMENT | SCHEDULED | ENRICHED | |
| ENRICH ONE TIME IMMEDIATE PAYMENT | ONE TIME PAYMENT | PENDING | ENRICHED | PUBLISH EVENT FOR ONE TIME FUNDS TRANSFERS AND ONE TIME P&C, CREDIT CARD, LIFE, LOAN AND HELOC PAYMENTS USING A BANK ACCOUNT |

| USE CASE | EVENT TYPE | ACTIVITY | ACTION | NOTES |
|---|---|---|---|---|
| ONE TIME SCHEDULED | | | | |
| RECONCILE ONE TIME PAYMENT | ONE TIME PAYMENT | PROCESSED | COMPLETE EXPIRED | PUBLISH EVENT FOR ONE TIME FUNDS TRANSFERS AND ONE TIME P&C, CREDIT CARD, LIFE, LOAN AND HELOC PAYMENTS USING A BANK ACCOUNT |
| ADD NEW ONE TIME EXTERNAL PAYMENT | ONE TIME PAYMENT | SCHEDULED | | PUBLISH EVENT |
| UPDATE ONE TIME EXTERNAL PAYMENT | ONE TIME PAYMENT | SCHEDULED | | PUBLISH EVENT |
| DELETE ONE TIME EXTERNAL PAYMENT | ONE TIME PAYMENT | SCHEDULED | | PUBLISH EVENT |
| RECONCILE ONE TIME EXTERNAL PAYMENT | RECONCILE | COMPLETE | | PUBLISH EVENT |
| ADD NEW RECURRING EXTERNAL PAYMENT | RECURRING PAYMENT | SCHEDULED | | PUBLISH EVENT |
| UPDATE RECURRING EXTERNAL PAYMENT | RECURRING PAYMENT | SCHEDULED | | PUBLISH EVENT |

| USE CASE | EVENT TYPE | ACTIVITY | ACTION | NOTES |
|---|---|---|---|---|
| ONE TIME SCHEDULED | | | | |
| DELETE RECURRING EXTERNAL PAYMENT | RECURRING PAYMENT | SCHEDULED | | PUBLISH EVENT |
| RECONCILE RECURRING EXTERNAL PAYMENT | RECONCILE | COMPLETE | | PUBLISH EVENT |
| FORECAST RECURRING EXTERNAL PAYMENT | FORECAST | SCHEDULED | | PUBLISH EVENT |
| ADD NEW P2P TRANSFER | PENDING | PENDING | | PUBLISH EVENT |
| RECONCILE P2P TRANSFER | RECONCILE | COMPLETE | | PUBLISH EVENT |
| LIFE APP | RECURRING PAYMENT | SCHEDULED | | PUBLISH EVENT |
| ADD ONE TIME PAYMENT INVESTMENT | ONE TIME PAYMENT | SCHEDULED | | PUBLISH EVENT |

FIG. 16

SYSTEM AND METHOD FOR FRAUD DETECTION USING EVENT DRIVEN ARCHITECTURE

CROSS-REFERENCE TO RELATED APPLICATIONS

This application is a continuation of and claims priority to U.S. application Ser. No. 16/428,785, filed May 31, 2019, titled "System and Method for Fraud Detection Using Event Driven Architecture," the disclosure of which application is hereby incorporated by reference herein in its entirety.

TECHNICAL FIELD

The present disclosure generally relates financial accounts, and in particular to a system and method for managing financial transaction information.

BACKGROUND

Banks and other financial institutions rely on information about financial transactions in order to perform a variety of functions, including providing account summary information to customers, performing fraud detection of financial transactions (or facilitating fraud detection performed by a third party), and managing accounts. Presently, these financial institutions must retrieve information about ongoing transactions (including scheduled and pending transactions) from various other financial transaction processing systems, such as credit card processors and automated clearing house (ACH) payment providers. Because the status of various transactions is constantly changing, the financial institution must make many requests to many different systems in order to obtain real time transaction information. This may lead to higher latency in providing current information, such as current account balances. Moreover, data retrieved directly from external systems may comprise raw data that has not been enriched (for example, cleaned and categorized) and may therefore be less reliable. This data may lead to inaccurate account information (such as an inaccurate account balance), and may not be useful for fraud detection.

Furthermore, because different financial transaction processing systems and providers may use different data formats and record different data milestones, it may be difficult for a bank or other financial institution to obtain a complete historical record for any given financial transaction. This can be a problem, for example, when the financial provider needs to close an account, since there may not be a record of all ongoing transactions that must be canceled before the account can be closed.

There is a need in the art for a system and method that addresses the shortcomings discussed above.

SUMMARY

In one aspect, a method of reducing latency in providing an account balance for a financial account includes steps of listening for financial transaction events on an event stream, and detecting a transaction event for a financial transaction, where the transaction event is published by a financial transaction processing system. The method also includes steps of storing transaction data associated with the transaction event in a datastore, receiving an account balance request, retrieving the transaction data from the datastore and calculating the account balance using the transaction data, and providing the account balance.

In another aspect, a method of sending account alerts to a customer for a financial account includes steps of listening for financial transaction events on an event stream, and detecting a transaction event for a financial transaction, where the transaction event is published by a financial transaction processing system and the transaction event is associated with transaction data. The method also includes steps of sending a request to enrich the transaction data, receiving enriched transaction data and publishing an enriched data event, and sending an account notification to a device associated with the customer, where the account notification includes information from the enriched transaction data.

In another aspect, a system for providing account information for a financial account includes an event stream and a first subsystem. The first subsystem is configured to receive transaction events in the event stream from a plurality of financial transaction processing systems, communicate with a data enrichment service to create enriched transaction data, and publish enriched transaction events to the event stream. The system also includes a second subsystem system configured to receive enriched transaction events from the event stream and persist the enriched transaction data in long term storage. The system also includes a third subsystem system configured to receive the enriched transaction data and use the enriched transaction data to provide account information to an end user.

In another aspect, a method of detecting fraudulent activity for a financial account includes listening for financial transaction events on an event stream and detecting a transaction event for a financial transaction. The transaction event is published by a financial transaction processing system and the transaction event is associated with transaction data. The method also includes sending a request to enrich the transaction data, receiving enriched transaction data and publishing an enriched data event, analyzing the enriched transaction data, and detecting fraudulent activity associated with the financial transaction.

In another aspect, a method of sending fraud alerts to a customer for a financial account includes steps of listening for financial transaction events on an event stream and detecting a transaction event for a financial transaction. The transaction event is published by a financial transaction processing system and the transaction event is associated with transaction data. The method also includes steps of sending a request to enrich the transaction data, receiving enriched transaction data and publishing an enriched data event, analyzing the enriched transaction data for fraudulent activity, and sending a fraud notification to a device associated with the customer. The fraud notification includes information from the enriched transaction data.

In another aspect, a system for detecting fraud for a financial account includes an event stream and a first subsystem configured to receive transaction events in the event stream from a plurality of financial transaction processing systems, communicate with a data enrichment service to create enriched transaction data, and publish enriched transaction events to the event stream. The system also includes a second subsystem system configured to receive enriched transaction events from the event stream and persist the enriched transaction data in long term storage. The system also includes a third subsystem system configured to receive the enriched transaction data and analyze the enriched transaction data to detect fraudulent activity.

In another aspect, a method for closing a financial account includes steps of listening for financial transaction events on an event stream, detecting a transaction event for a financial transaction. The transaction event is published by a financial transaction processing system and the transaction event is associated with transaction data. The method also includes steps of sending a request to enrich the transaction data, receiving enriched transaction data and publishing an enriched data event, receiving an account closing request, using the enriched transaction data to determine that the financial transaction has not posted, retrieving information about the financial transaction processing system associated with the financial transaction from the enriched transaction data, sending a request to the financial transaction processing system to cancel the financial transaction, receiving a confirmation that the financial transaction has been canceled, and closing the financial account.

In another aspect, a method for closing a financial account includes steps of listening for financial transaction events on an event stream and detecting a transaction event for a financial transaction from the event stream. The transaction event is published by a financial transaction processing system and the transaction event is associated with transaction data. The method also includes sending a request to enrich the transaction data, receiving enriched transaction data and publishing an enriched data event, receiving an account closing request, using the enriched transaction data to determine that the financial transaction has not posted, retrieving information about the transaction processing system associated with the financial transaction from the enriched transaction data, and publishing a transaction cancellation request event to the event stream. The transaction cancellation request event is associated the financial transaction. The method also includes detecting a transaction cancellation confirmation event from the event stream and closing the financial account.

In another aspect, a system for closing financial accounts includes an event stream and a first subsystem configured to receive transaction events in the event stream from a plurality of financial transaction processing systems, communicate with a data enrichment service to create enriched transaction data, and publish enriched transaction events to the event stream. The system also includes a second subsystem system configured to receive enriched transaction events from the event stream and persist the enriched transaction data in long term storage. The system also includes a third subsystem system configured to receive the enriched transaction data and cancel transactions in response to account closing requests.

Other systems, methods, features, and advantages of the disclosure will be, or will become, apparent to one of ordinary skill in the art upon examination of the following figures and detailed description. It is intended that all such additional systems, methods, features, and advantages be included within this description and this summary, be within the scope of the disclosure, and be protected by the following claims.

BRIEF DESCRIPTION OF THE DRAWINGS

The invention can be better understood with reference to the following drawings and description. The components in the figures are not necessarily to scale, emphasis instead being placed upon illustrating the principles of the invention. Moreover, in the figures, like reference numerals designate corresponding parts throughout the different views.

FIG. 8 is a schematic view of an event data structure that is associated with a financial transaction record, according to an embodiment;

FIGS. 9-17 are schematic views of tables indicating use cases for various transaction events, according to an embodiment;

DESCRIPTION OF THE EMBODIMENTS

Figure 1:
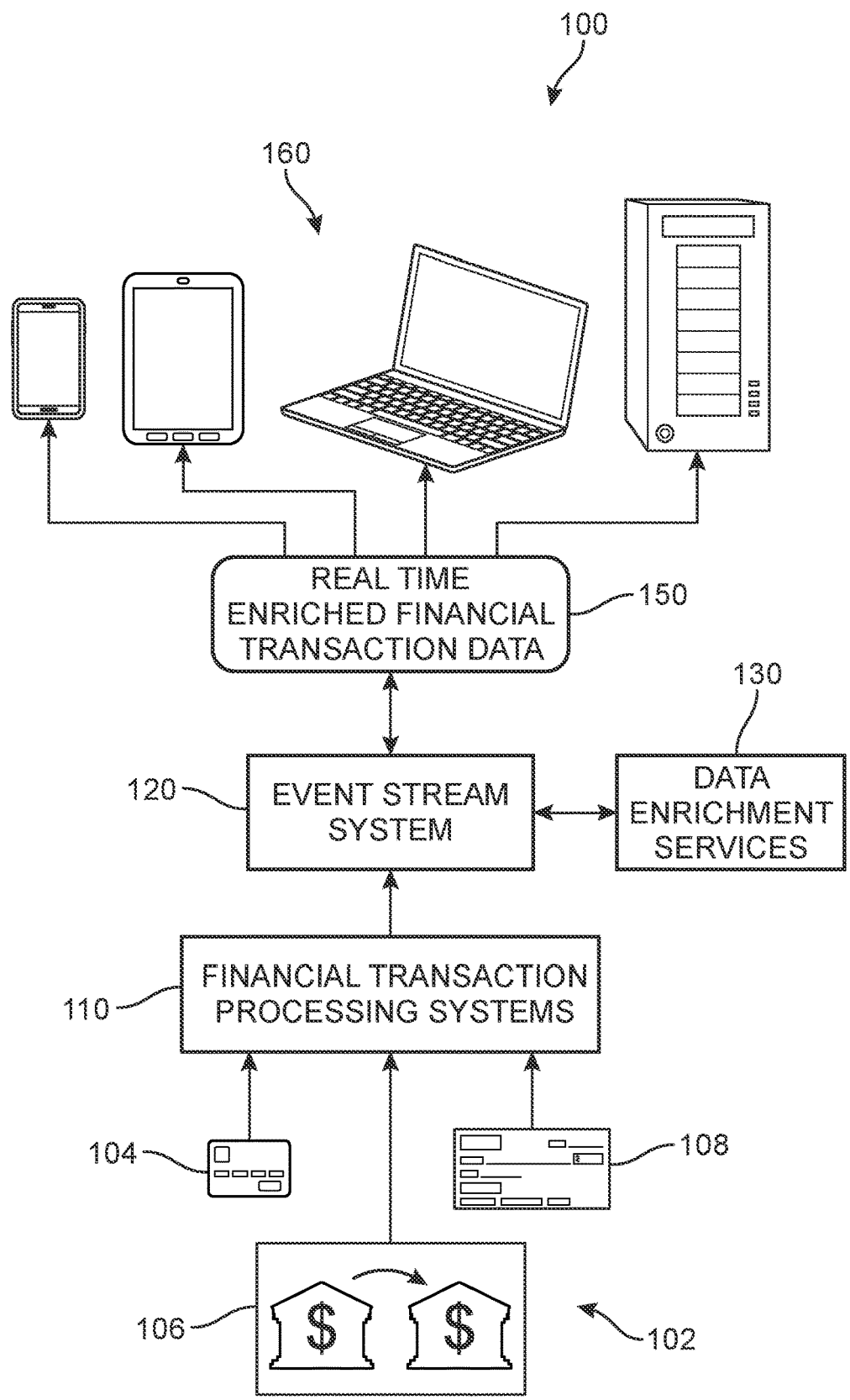
FIG. 1 is a schematic view of a system for creating enriched financial transaction data, according to an embodiment.

The embodiments provide a highly available, efficient, and comprehensive system for managing financial transaction data. The system and associated methods use an event driven architecture that allows financial transaction data to be gathered from source systems and enriched in real time or near real time to facilitate consistent end user experiences across a variety of product platforms and digital channels. Specifically, this event driven architecture uses event streams to coordinate the creation, exchange, modification, and storage of financial transaction data. Using this architecture, the entire lifecycle of a given financial transaction can be captured, from origination within a business system (such as a credit card processing system) to reconciliation and posting of the transaction. This architecture further enables a variety of different applications, including improved account summaries, faster and more accurate fraud detection and data analytics, and a streamlined account cancellation process.

The embodiments enable business systems to publish events to an event stream, thereby making the transaction data immediately available to a variety of different components. Specifically, this configuration allows for the enrichment of both scheduled and pending transactions throughout the transaction lifecycle, as opposed to enriching transaction data after the transaction has been posted. The embodiments further improve data replication and improved data access through event streams. Because the system enables the history of each transaction to be traced, from the period the transaction is pending through to the time the transaction is posted, the embodiments help to improve overall data quality.

The embodiments may also reduce operational load on the various business systems and services responsible for processing financial transactions, including credit card processors, web bill payment systems, as well as other systems. Specifically, these systems may offload some data storage and/or communication responsibilities to downstream systems by publishing events with transaction data to events streams rather than solely maintaining local books of record and managing proprietary APIs for data exchange.

As used herein, the term "financial transaction" refers to any transaction where money is exchanged between two parties. Examples of financial transactions include, but are not limited to: credit card purchases, debit card purchases, bank to bank transfers, peer to peer payments, wire transfers, payments by check, as well as a variety of other kinds of financial transactions. Throughout this detailed description the terms "transaction data" and "transaction information" are used to describe any information related to one or more financial transactions. In addition, the term "transaction record" is used to refer to a particular data structure that holds transaction data/information. Transaction records could be stored, for example, within a table in a database, or within flat files.

FIG. 1 is a schematic view of a system 100 for generating and using real time enriched financial transaction data. As shown schematically, inputs to the system include various kinds of financial transactions 102. For example, financial transactions 102 may further include credit card transactions 104, bank to bank transfers 106 and/or cashing checks 108. These financial transactions may originate at various point of sale systems (for example, swiping a credit card at a vendor), between financial institutions (for example, bank to bank wires and/or loans), and/or as part of a banking service (for example, cashing a check). For clarity, only some exemplary financial transactions are shown, however it may be appreciated that any known financial transactions could be used as inputs for the present system shown in FIG. 1.

Figure 2:
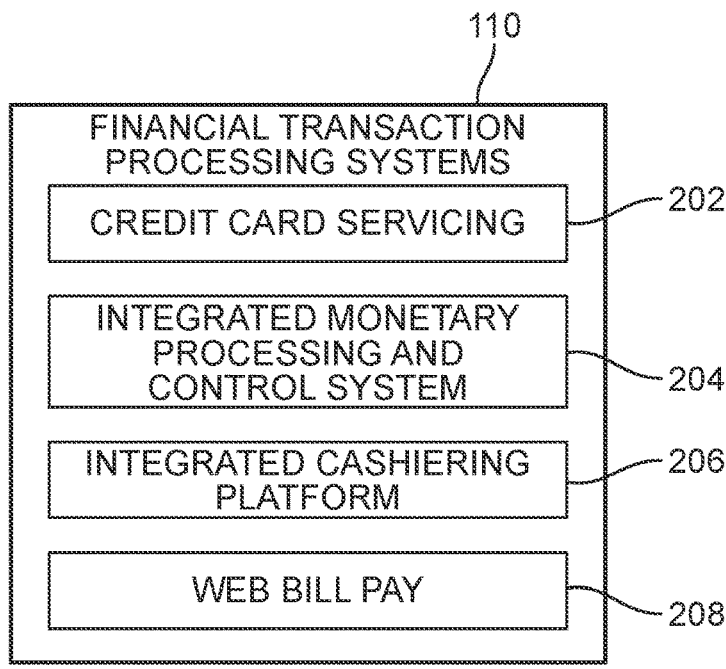
FIG. 2 is a schematic view of a set of financial transaction processing systems, according to an embodiment.

Once financial transactions 102 have been initiated, for example at a point of sale, the transactions may be processed by one or more financial transaction processing systems. As used herein, the term "financial transaction processing system" refers to any business, system, or service that is involved in processing a financial transaction. A financial transaction processing system may also be referred to as a system of record. As seen in FIG. 1, system 100 system includes one or more financial transaction processing systems 110, also referred to simply as processing systems 110. A set of exemplary processing systems 110 are shown schematically in FIG. 2. These include a credit card servicing system 202, an integrated monetary and processing system 204, an integrated cashiering platform 206, and a web bill pay system 208.

Each of these financial transaction processing systems provides various kinds of services or functionality. Credit card servicing system 202 enables various functionality for all credit card transactions, including account management, credit and/or debit card management, statement generation, financial accounting fraud detection, online authorization, and settlement. Integrated monetary processing and control system 204 facilitates core processing of checking and saving accounts. Integrated cashiering platform 206 provides money movement capabilities including Automated Clearing House (ACH) transfers, wire transfers, check disbursements, and periodic investment plan payments. Web bill pay system 208 includes applications and infrastructure that supports payment of bills from third parties (for example, an electric bill or cable bill). It may be appreciated that in other embodiments, still other financial transaction processing systems could be used. For example, processing systems could further include systems to facilitate managing mutual funds, systems to facilitate managing insurance and annuities, as well as additional money movement platforms (such as digital payment platforms).

Referring back to FIG. 1, system 100 also includes an event stream system 120. Event stream system 120 provides an event driven architecture for system 100. An "event" is any message that contains information about a change in state of something, such as a financial transaction. An "event stream" is a record of a sequence of events.

Within this event driven architecture, components of system 100 can publish events to event streams and/or list to events published to the event streams. In one embodiment, events produced within event stream system 120 are written to a log, and event consumers can read from any part of the stream in the event log. Embodiments could use any event streaming platforms known in the art. In another embodiment, system 100 could comprise a publication-subscription type event system, in which consumers subscribe to a channel and new events are sent to subscribers rather than being recorded in an event stream.

Figure 3:
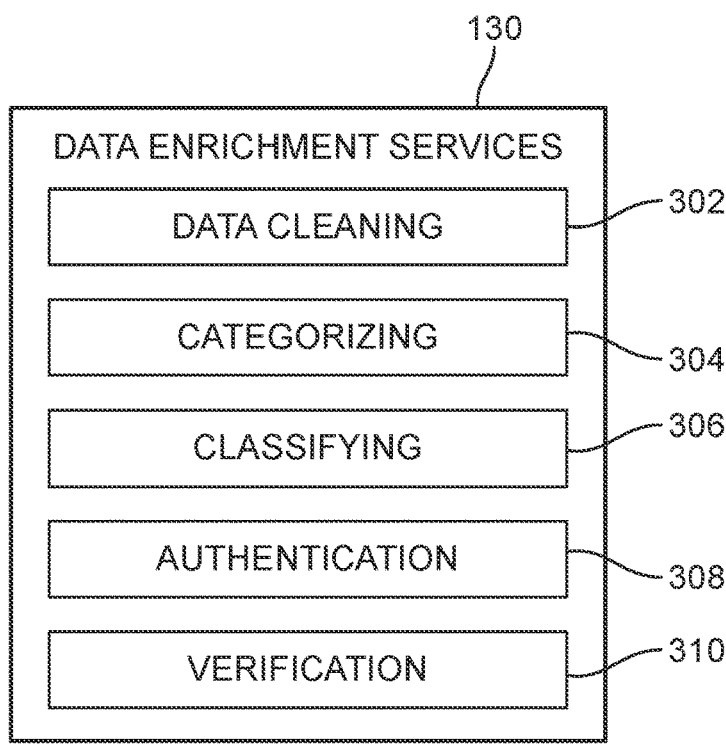
FIG. 3 is a schematic view of a set of data enrichment services, according to an embodiment.

System 100 also includes one or more data enrichment services 130. A data enrichment service can provide various kinds of functionality to improve raw data provided by one or more financial transaction processing systems. As seen in FIG. 3, data enrichment services 130 can facilitate data cleaning 302, categorizing 304, classifying 306, authentication 308, and verification 310. In some embodiments, data retrieved by components of system 100 can be enriched using data enrichment services 130. In some cases, an application program interface (API) can be used to send raw data and receive enriched data.

By leveraging event stream system 120 and data enrichment services 130, raw data can be obtained in real or near real time from financial transaction processing systems 110 and immediately converted into enriched financial transaction data 150, rather than waiting until the transaction has reached a particular milestone, such as when the transaction is posted. The enriched financial transaction data 150 can then be consumed by various end users 160 (for example, mobile platforms, desktop platforms and backend systems) at any time during the lifecycle of the financial transaction. Moreover, using real time enriched data for all transactions, regardless of the transaction's state (for example, pending or posted) allows for a consistent presentation of data across different usage channels/users, thereby improving compliance, transparency, accuracy, and customer satisfaction.

Figure 4:
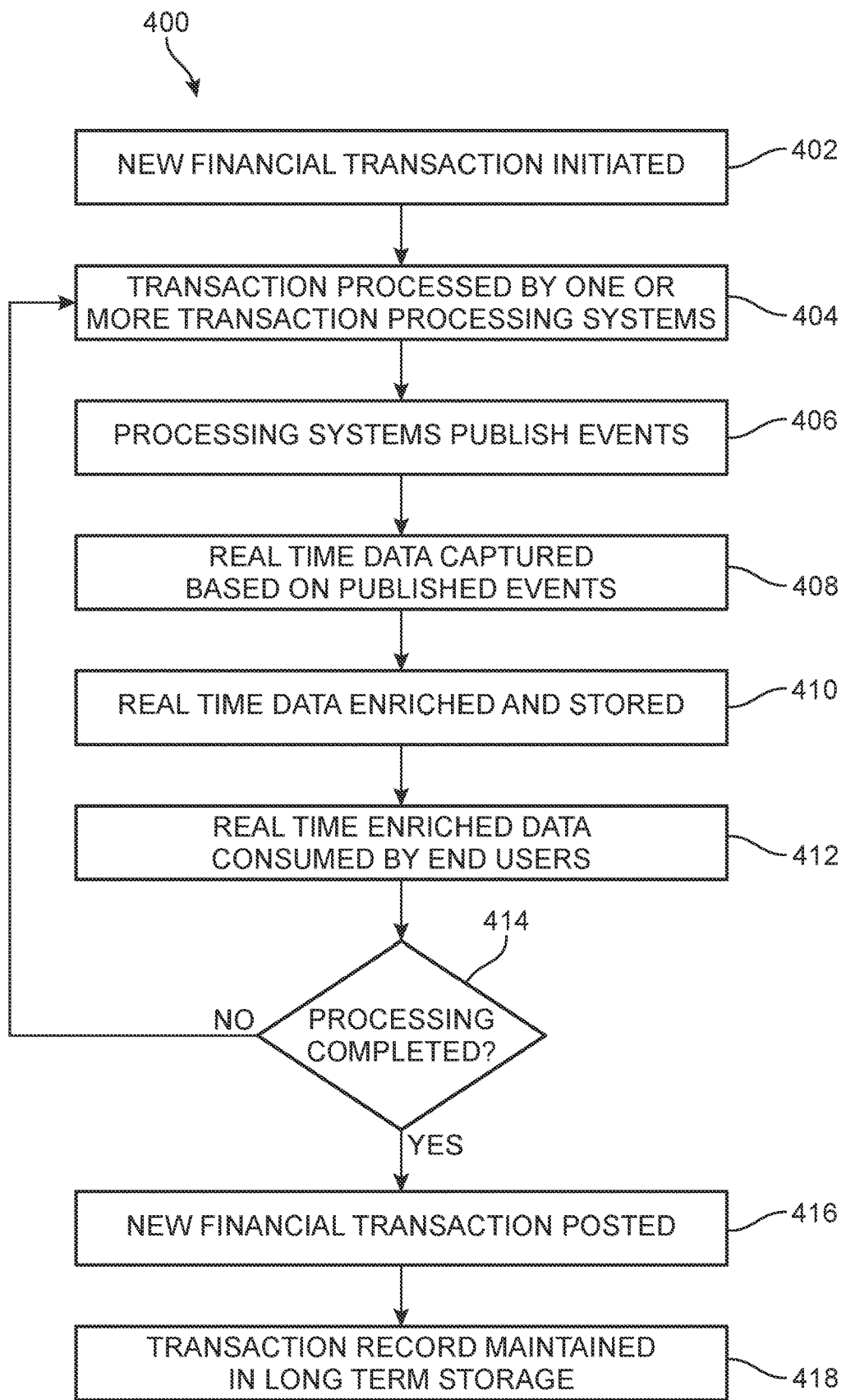
FIG. 4 is a schematic view of a process for capturing and using real time enriched financial transaction data, according to an embodiment.

FIG. 4 is a schematic view of a process 400 for creating and using real time enriched financial transaction data according to an embodiment. In a first step 402, a new financial transaction is initiated. The new transaction may be initiated at a merchant, for example, via a credit card swipe. The new transaction could also be a new ACH transfer or wire transfer. In some cases, the new transaction could be a scheduled transaction, such as a scheduled ACH transfer to take place at a later date.

Next, in step 404, the transaction may be processed by one or more transaction processing systems. Some transactions may be processed by a single processing system, while other transactions may be processed by two or more processing systems, either in sequence or in parallel.

In step 406, as each processing system performs operations to process a transaction, information related to those operations may be published as events so that other components in the system can react to these events. In step 408, real time data is captured in response to published events. Specifically, one or more components may consume those published events, which include information about the real time processing of one or more financial transactions.

In step 410, the financial transaction data associated with the published events can be enriched and stored. As described in further detail below, enrichment can be performed by a separate system or service using an API. In some cases, the enriched data can be recorded in long term storage, such as a database or other long-term storage (LTS) system. In other cases, the enriched data can be incorporated into records stored within the event stream itself so that the enriched data is available for lookup in records within the event stream. In some cases, enriched data could be incorporated into the event stream and also maintained in another form of long-term storage, such as a database.

In step 412, real time enriched data may be consumed by one or more end users. In some cases, the real time enriched data may be available in records stored in the event stream. In other cases, the real time enriched data may be available in a separate database that stores data outside of the event stream.

In step 414, the system checks to see if the financial transaction has been fully processed by the various transaction processing systems. If not, the system returns to step 404 to wait for continued processing. If processing has been completed, the new financial transaction is posted to the customer's account in step 416. In some cases, after the transaction has posted it may be maintained in long-term storage as in step 418.

Figure 5:
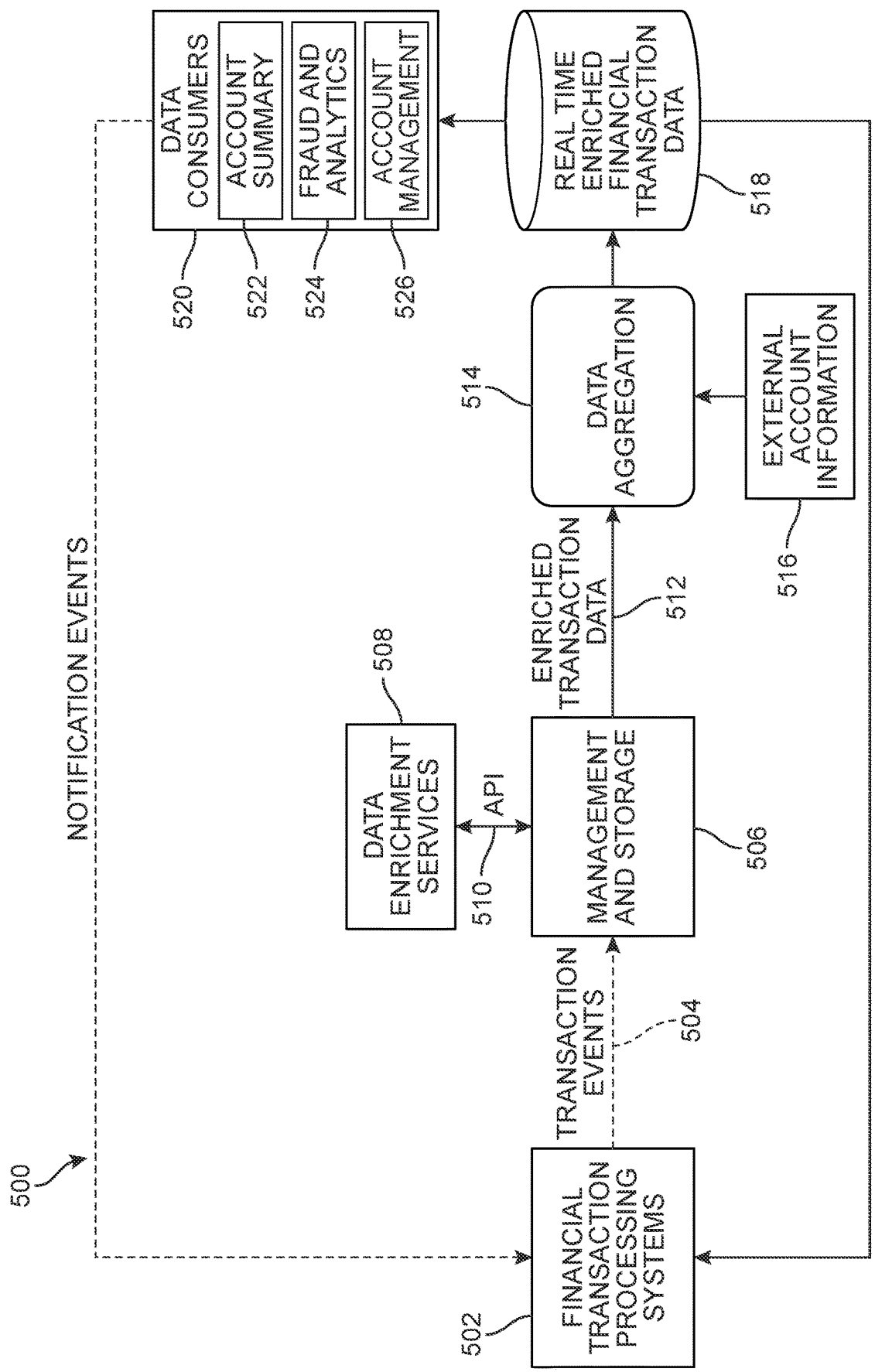
FIG. 5 is a schematic view of a system with an event driven architecture that is used to collect and manage enriched financial transaction data, according to an embodiment.

FIG. 5 is a schematic view of one exemplary architecture 500 for a system that can perform the process described in FIG. 4. New financial transactions are initiated through one or more financial transaction processing systems 502. At predetermined stages of processing, financial transaction processing systems 502 generate transaction events 504 that are published to an event stream. These events are consumed by one or more components within management and storage systems 506. The management and storage systems 506 interacts with data enrichment services 508 using an API 510 and generates enriched transaction data 512.

A data aggregation system 514 may receive the enriched transaction data 512. In some cases, the enriched transaction data 512 may be provided over an event stream. In other cases, data aggregation system 514 may make requests to management and storage system 506, receiving enriched transaction data 512 in response. Data aggregation system 514 may also gather external account information 516, as well as possibly other externally available information.

Data aggregation system 514 generates a set of real time enriched financial transaction data 518 for consumption by various data consumers 520. In some cases, data aggregation system 514 can build a database for storing transaction records. This database could then be queried by one or more data consumers. In other cases, data aggregation system 514 may simply query databases within management and storage system 506 (for example, database 628 that is discussed below and shown in FIG. 6) and pass the results to one or more data consumers. Exemplary data consumers include, but are not limited to: an account summary system 522, fraud and analytics system 524, and account management system 526.

Figure 6:
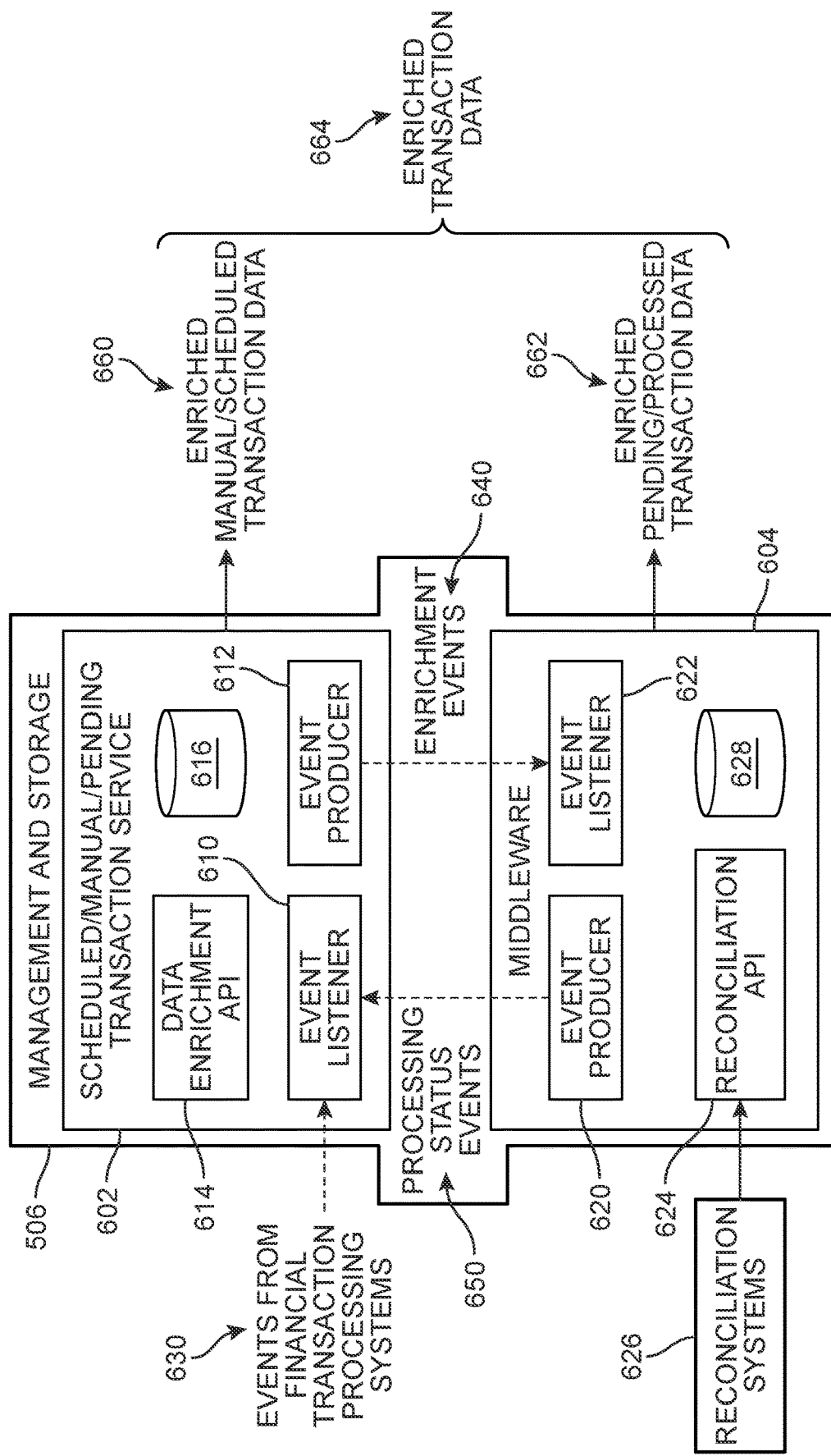
FIG. 6 is a schematic view of some subcomponents of the management and storage system of FIG. 5, according to an embodiment.

FIG. 6 is a schematic view of subsystems (of subcomponents) of the management and storage systems 506 depicted in FIG. 5. These subcomponents, or services, may include a first subsystem and a second subsystem. In this case, the first subsystem is referred to as a transaction service 602 that manages transactions that have not yet posted. These may include, but are not limited to: scheduled, manual, and pending transactions. The term pending transactions may also encompass authorizations (such as credit card authorization transactions). Additionally, management and storage systems 506 can include a middleware system 604. Middleware system 604 include subcomponents or modules to manage reconciliation of payments and long-term storage for transaction data.

Transaction service 602 comprises various components and processes responsible for listening to an event stream, enriching transaction data, maintaining a historical log of activity, as well as powering account activity for scheduled and manual transactions. Additionally, transaction service 602 may publish enrichment events for pending transactions. Transaction service 602 includes an event listener 610 for listening to events published on an event stream and an event producer 612 for publishing events to an events stream. Transaction service 602 also includes a data enrichment API 614 for interfacing with one or more data enrichment services (for example, data enrichment services 508 of FIG. 5). Transaction service 602 also includes provisions for storing data, such as database 616.

Middleware system 604 includes various components and processes responsible for storing enriched data for pending and processed transactions across various baking systems. Middleware system 604 may include an event producer 620 and an event listener 622. Middleware system 604 may also include a reconciliation API 624 that communicates with reconciliation systems 626 to reconcile processed transactions with scheduled transactions, manual transactions and pending transactions. Furthermore, long term storage systems 604 may include one or more databases 628 that provide long term storage of all processed and pending transaction data.

In operation, new manual and/or scheduled transactions are published on an event stream by financial transaction processing systems (for example, processing systems 502 of FIG. 5). These new events 630 are detected by event listener 610 of transaction service 602. New manual or scheduled transaction data can then be enriched using data enrichment API 614. This enriched data may be stored locally in database 616. Additionally, transaction service 602 can alert middleware system 604 about newly enriched data. Specifically, event producer 612 publishes enrichment events 640, which are detected by event listener 622 of middleware system 604. This enriched data may be stored in one or more of databases 628. Using reconciliation API 624, reconciliation of scheduled, manual, and pending transactions are performed. Information about transactions that have been completed (for example, posted) or expired can be sent back to transaction service 602. Specifically, event producer 620 publishes processing status events 650 that are received by event listener 610. In some cases, these can include processed complete events and processed expired events.

Enriched transaction data may be fed to a data aggregator (for example, data aggregation system 514 of FIG. 5) from both transaction service 602 and middleware system 604. Specifically, enriched manual and scheduled transaction data 660 may be obtained from transaction service 602. Additionally, enriched pending and processed transaction data 662 can be obtained from middleware system 604. This data, which collectively may be referred to as enriched transaction data 664 is used by a data aggregator to provide real time enriched financial transaction data for consumption by end users.

Figure 7:
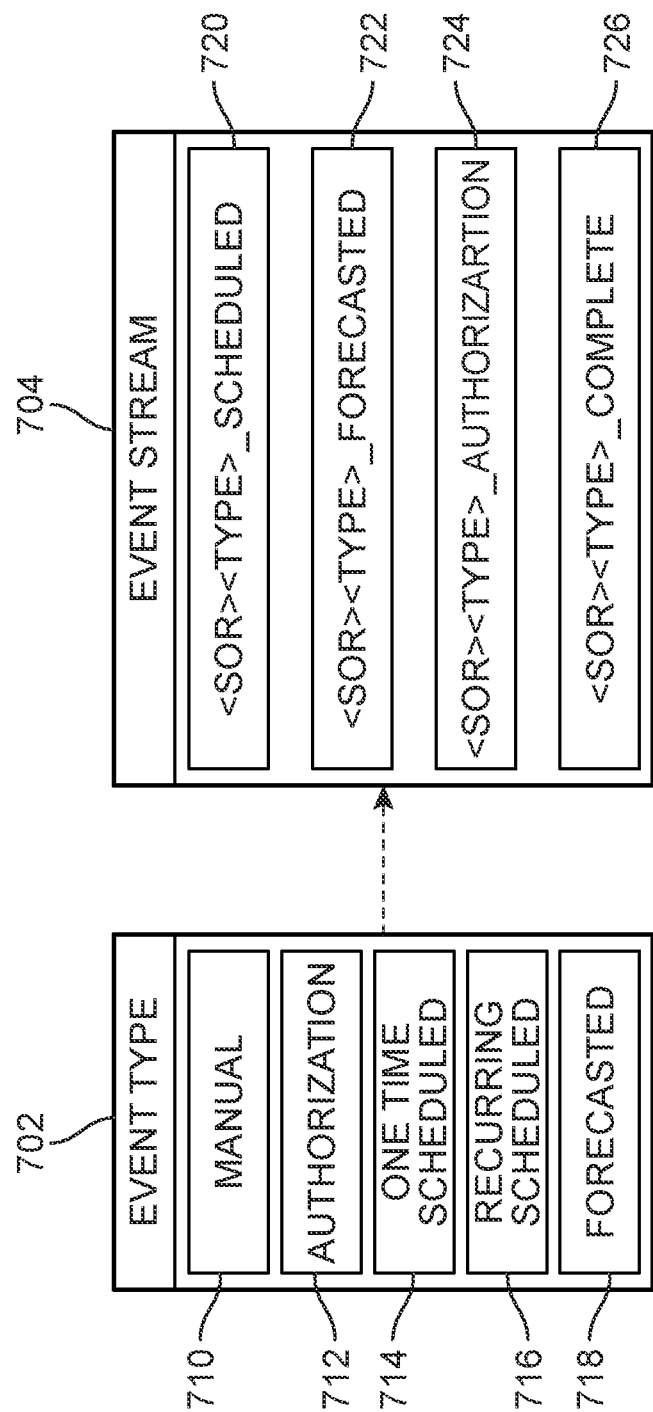
FIG. 7 is a schematic view of a set of event types and corresponding event streams, according to an embodiment.
Figure 13:

Because different components may be primarily interested in particular types of transactions (for example, manual or scheduled transactions), some embodiments can use multiple different event streams for different transaction types. As shown schematically in FIG. 7, in one exemplary embodiment different event types 702 may be published onto one or more different event streams 704. In this example, event types 702 include a manual event type 710, an authorization event type 712 (for processing authorization information for a transaction), a one-time scheduled event type 714, a recurring scheduled event type 716 and a forecasted event type 718. Furthermore, event streams 704 include a scheduled event stream 720 (which can include both one-time scheduled events and recurring scheduled events), a forecasted event stream 722, an authorization event stream 724, and a complete event stream 726 (for indicating when a transaction has completed).

FIG. 8 depicts a schematic view of a data schema, data structure, or data container that includes information about a financial transaction. In some cases, such a schema could be referred to as a transaction record. In this case, data structure 800 includes a set of fields that capture the details for a given transaction event. In some cases, each event incorporates a copy of data structure 800 and/or the relevant parts of data structure 800. As an example, a credit card processor could publish a new event for creating a new scheduled transaction. As part of the event, the processor could send a copy of data structure 800 with the relevant information filled in. In other cases, data structure 800 is constructed based on information passed through transaction events. For example, a credit card processor could send a message with information about a new scheduled transaction. Instead of sending a copy of the data structure with the event, a consumer of the event may construct a new data structure (or modify an existing data structure) based on information passed in the event. In some cases, a separate data structure can be created for each event. In other cases, new data structures may be created using some events and those same data structures could be modified by other events.

As seen in FIG. 8, each data field is associated with a predetermined domain of possible values. Data structure 800 includes: a "To Account" data field 801 that allows systems to record the destination account for a given transaction; a "To Account Routing Number" data field 802 that allows systems to record a particular routing number for the destination account; a "To Account Type" data field 803 that allows systems to record an account type for the destination account (such as Checking, Savings, Credit Card Broker, etc.). Data structure 800 also includes corresponding fields for the originating (or "from") account, including a "From Account" data field 804, a "From Account Routing Number" data field 805, and a "From Account Type" data field 806. Data structure 800 also includes: an "amount" data field 807 that allows systems to record the amount of money being transacted; a "Scheduled On" data field 808 that allows systems to record a date that the scheduled transaction was entered; a "Scheduled for" data field 809 that allows systems to record a future day when a transaction should be processed; a "Submitted by" data field 810 that allows systems to record a submitting party for the transaction (for example, Signatory, Primary, and Secondary parties); a "Requested by" data field 811 that allows systems to record a requesting party for the transaction; and an "originated by" data field 812 that allows systems to record an originating party for the transaction (for example, "Primary", "Signatory on behalf of the primary," etc.). Data structure 800 may also include a "Memo field" data field 813 that allows systems to record any information in the memo field of a funds transfer or bill pay transaction.

Data structure 800 may also include source system information, such as a "Source System Confirmation ID" data field 814, a "Source System Generated ID" data field 815, and a "Source" data field 816. The ID fields may be populated with numbers, while the "source" data field may indicate the name of a financial partner or other company participating in the transaction. Data structure 800 may also include a "Type" data field 817 that allows systems to record event types, such as the event types described above and shown in FIG. 7. Data structure 800 may also include a "Channel" data type 818 that allows systems to record the channel or platform through which the transaction occurred, such as "web", "mobile," "representative," or "voice."

Data structure 800 may also include a "Status" data field 819 that allows systems to record the status of a transaction, for example either "pending" or "processed." Data structure 800 also allows for the recording of dates and times indicating when a transaction is posted, settled, time until a transaction is live, and time until a transaction is displayed. Specifically, data structure 800 includes a "Posted Date" data field 820, a "Settlement Date" data field 821, a "Time to Live" data field 822, and a "Time to Display" data field 823.

Data structure 800 can also include data fields for recording transaction codes provided by different financial transaction processing systems (or other systems of record). For example, data structure 800 can include a "Transaction Code" data field 824 for storing numerical codes (201, 310, 311, etc.). Data structure 800 can also include data fields for recording information about transaction overrides, including an "Override Transaction Description" data field 825 and an "Override Category" data field 826.

Data structure 800 can also include data fields indicating information about scheduled transactions. Specifically, data structure 800 may include a "Frequency Type" data field 827, with values such as "Weekly", "Bi-weekly", etc. Data structure may also include a "Frequency Duration" data field 828 indicating the length between transaction events, a "Frequency End Date" data field 829 indicating a date when a recurring transaction will cease (or having a value of "Null" if there is no end date), and a "Frequency Action" data field 830, with values such as "Individual" or "Series".

Data structure 800 may comprise a record of a particular financial transaction. Multiple records may be collected into a single table. The table may be stored within a database, or in a distributed format across multiple systems. In some embodiments, records could be stored in a database or other datastore that is separate from an event stream. In other embodiments, records may be stored as part of an event stream. Records may be stored in a variety of different formats, including using flat files, using indexed sequential access method (ISAM), using heap files, using hash buckets, and/or using B+ trees.

Figure 17:

FIGS. 9-17 are tables providing a list of exemplary events that can be published to an event stream indicating a change in the state of a particular transaction record (for example, data structure 800 in FIG. 8). Specifically, table 900 and table 1000 in FIG. 9 and FIG. 10 provide example events related to manual transactions. Also, table 1100, table 1200, and table 1300 in FIG. 11, FIG. 12, and FIG. 13 respectively provide example events related to recurring bank transfers. Also, table 1400, table 1500, and table 1600 in FIG. 14, FIG. 15, and FIG. 16 respectively provide example events related to one-time scheduled events. Also, table 1700 in FIG. 17 provides example events related to additional one-time scheduled events.

Each event has a use case, an event type, an activity, and an action. A "notes" field also provides a description of the event. For example, in table 900 (FIG. 9), event entry 902 may be used to add a new one-time manual payment. The system responsible for publishing the event is a manual/scheduled transaction service (MSTS), such as transaction service 602 in FIG. 6, which powers manual payments initiated through a user's bank account. The event type is "manual". The activity is "scheduled". And the action is to "create". As indicated in the notes field, this event is published for a new one-time manual payment event using a bank account. Thus, anytime a user makes a one-time payment from their bank account, the financial transaction processing system will publish a new event with information about the payment. This information may include "to" and "from" account information, transaction type, account routing number information, as well as various other relevant event data, including any relevant fields from data structure 800. In some cases, upon receiving the new one-time manual payment event, a transaction service, or other system, may create a new record for the one-time financial transaction. If the state of this transaction changes, the appropriate system will send a new transaction event, and the system storing the new record can update the record appropriately based on information from the transaction event.

As another example, in table 1100 (FIG. 11), an event entry 1102 may be used when reconciling a recurring bank transfer with pending/posted payments. The system responsible for publishing the event may be a middleware system (such as middleware system 604 of FIG. 6). The event type is "recurring payment". The activity is "scheduled". And the action is to report the transaction as "complete" or "expired". Thus, anytime a recurring payment is reconciled with pending/posted transactions, the bank's middleware system will publish a new event indicating that the transaction has been reconciled and report the result (complete or expired).

As shown in FIGS. 9-17, table 900, table 1000, table 1100, table 1200, table 1300, table 1400, table 1500, table 1600 and table 1700 provide a variety of different event descriptions that could be used to implement an event based architecture. For clarity, several examples of specific types of events have been discussed. However, one skilled in the art may use these exemplary tables to implement a large number of possible events to be used with an event stream and a corresponding a data structure (such as data structure 800) by reading the event descriptions. It may also be appreciated that the events listed in these tables are only exemplary and in other embodiments still other events could be used to indicate various changes in state of a financial transaction.

Figure 18:
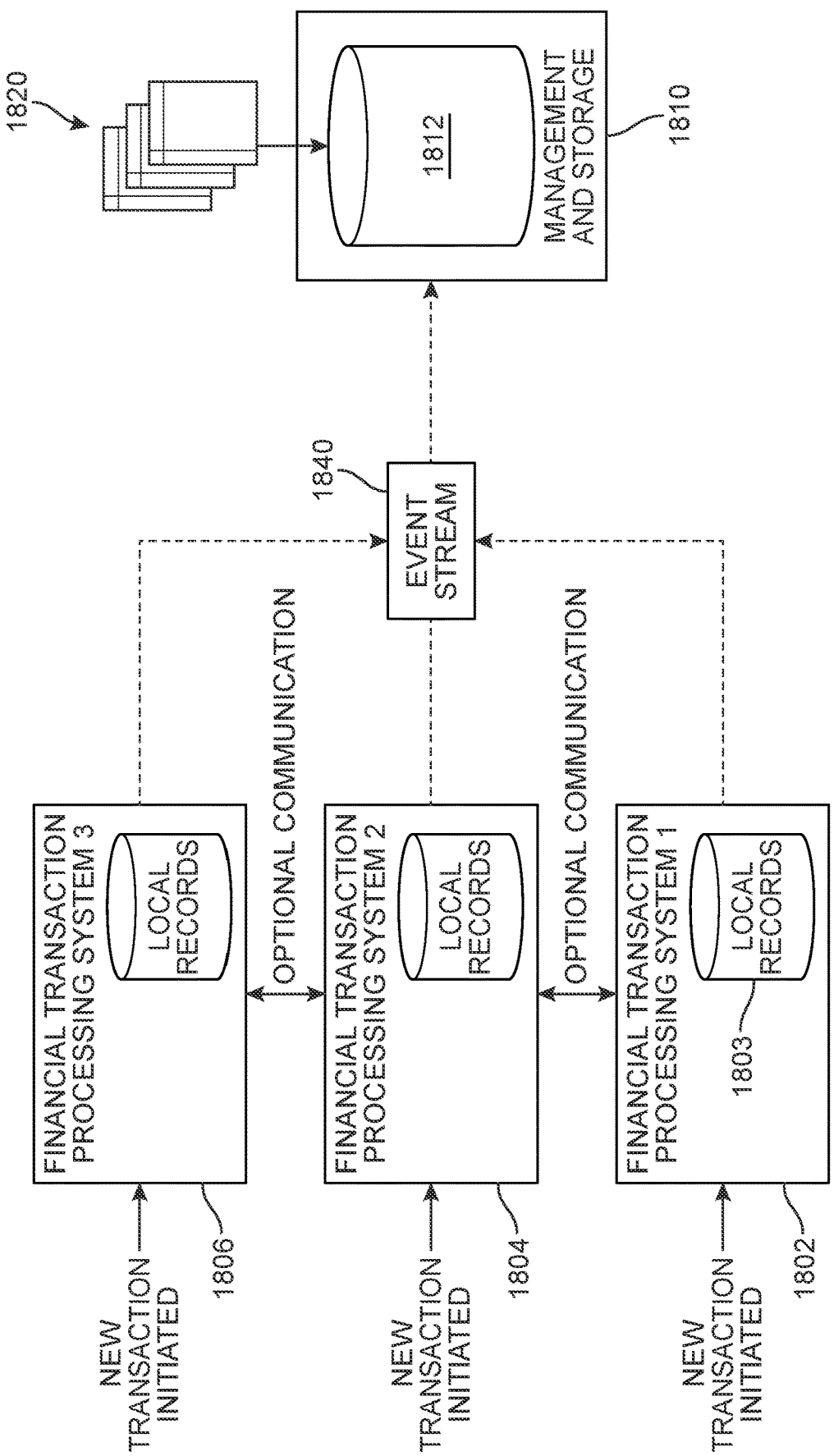
FIG. 18 is a schematic view of an architecture where enriched financial transaction data is collected by a management and storage system, according to an embodiment.
Figure 19:
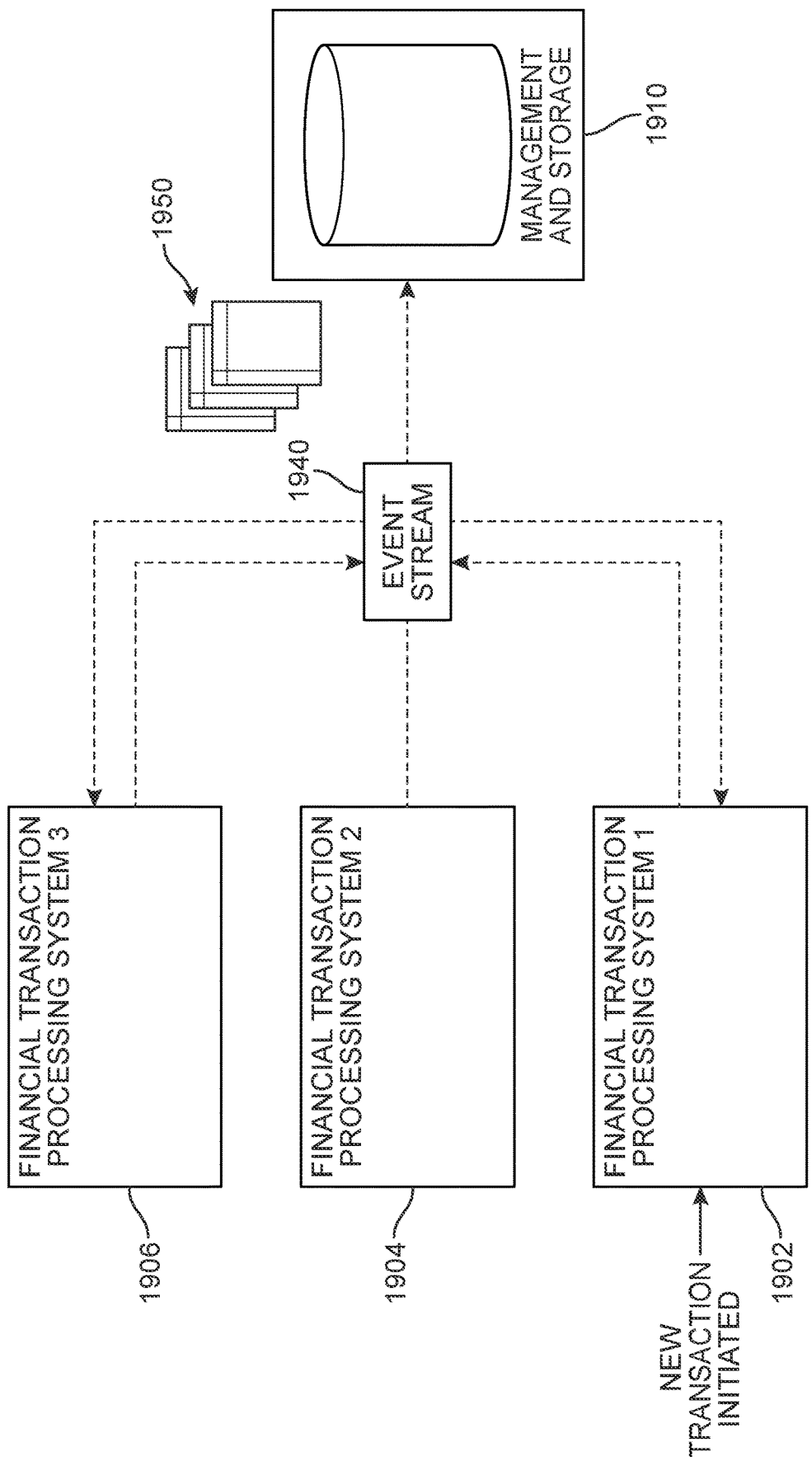
FIG. 19 is a schematic view of an architecture where enriched financial transaction data is passed between component systems, according to an embodiment.

FIGS. 18 and 19 depict different architectures that could be used to implement the above event based reporting and storage system for transaction records. In the embodiment shown in FIG. 18, events are published by one set of systems (financial transaction processing systems) and are consumed by another set of systems (management and storage systems). Specifically, in this case, a first financial transaction processing system 1802, a second financial transaction processing system 1804, and a third financial transaction processing system 1606 may publish events to an event stream 1840. A management and storage system 1810 listens to the event streams and consumes events for storage in datastore 1812. Moreover, in this embodiment, each processing system may keep its own book of business in local records (for example, local records 1803 of processing system 1802). But these local records may only reflect some of the data relevant to an ongoing financial transaction. The complete record, including a history of all changes made to the record, is stored in transaction records 1820 in datastore 1812. In this exemplary embodiment, there may be optional communication between the different processing systems. However, this information may be passed through APIs or other communication channels, rather than through an event stream.

In another embodiment, shown in FIG. 19, financial transaction processing systems publish events to an event stream. But unlike the configuration of FIG. 19, the financial transaction processing systems also consume transaction events. Specifically, a first processing system 1902, a second processing system 1904 and a third processing system 1906 all publish events to, and listen to events from, event stream 1940. Because the event stream itself contains all the information about the financial transaction, each financial transaction system can reconstruct the complete financial record 1950 using information from the event stream. In this configuration, financial transaction processing systems may not need to maintain local records related to the financial transactions, and the records maintained in (or reconstructed from) the event stream serves as a common datastore for both the financial transaction processing systems and management and storage system 1910.

Using the architecture of FIG. 19, a single transaction may be processed by multiple different processing systems which can utilize the event stream to indicate when a financial transaction has been processed by one system and is ready for processing by another system. In this way, the entire transaction record, maintained in (or reconstructed from) the event stream can be "passed" between different systems efficiently, without the need for APIs or other communication channels between processing systems that operate outside of the event stream.

Both architectures depicted in FIG. 18 and FIG. 19 provide a system and process for creating and maintaining real time transaction records. In the first case, shown in FIG. 18, the processing systems may independently send updates (via new events) for a given transaction, without necessarily having a full record of the transaction themselves. In contrast, in the second case, shown in FIG. 19, each processing system has access to the full transaction record (including its history) so that all systems have a real time view of the transaction record at all times.

As described herein, the exemplary systems and methods facilitate the creation of financial transaction records providing current and historical information about each financial transaction associated with a customer's financial account. These records can be stored and transmitted through the event stream, or consolidated in one or more data storage systems (databases, etc.). This allows data consumers to query the event stream itself, or the separate data storage systems, to retrieve current and/or historical information about a financial transaction as it passes through its lifecycle between being created and eventually posting to an account.

The embodiments may enable real time account summary information by leveraging enriched financial transaction data that is pushed to an event stream in real time. Specifically, the latest change in state for every kind of transaction, including manual, scheduled, pending, and posted transactions can be pushed to an event stream and used to build an account summary that captures the present and projected future state of an account balance and/or other account summary information.

Figure 20:
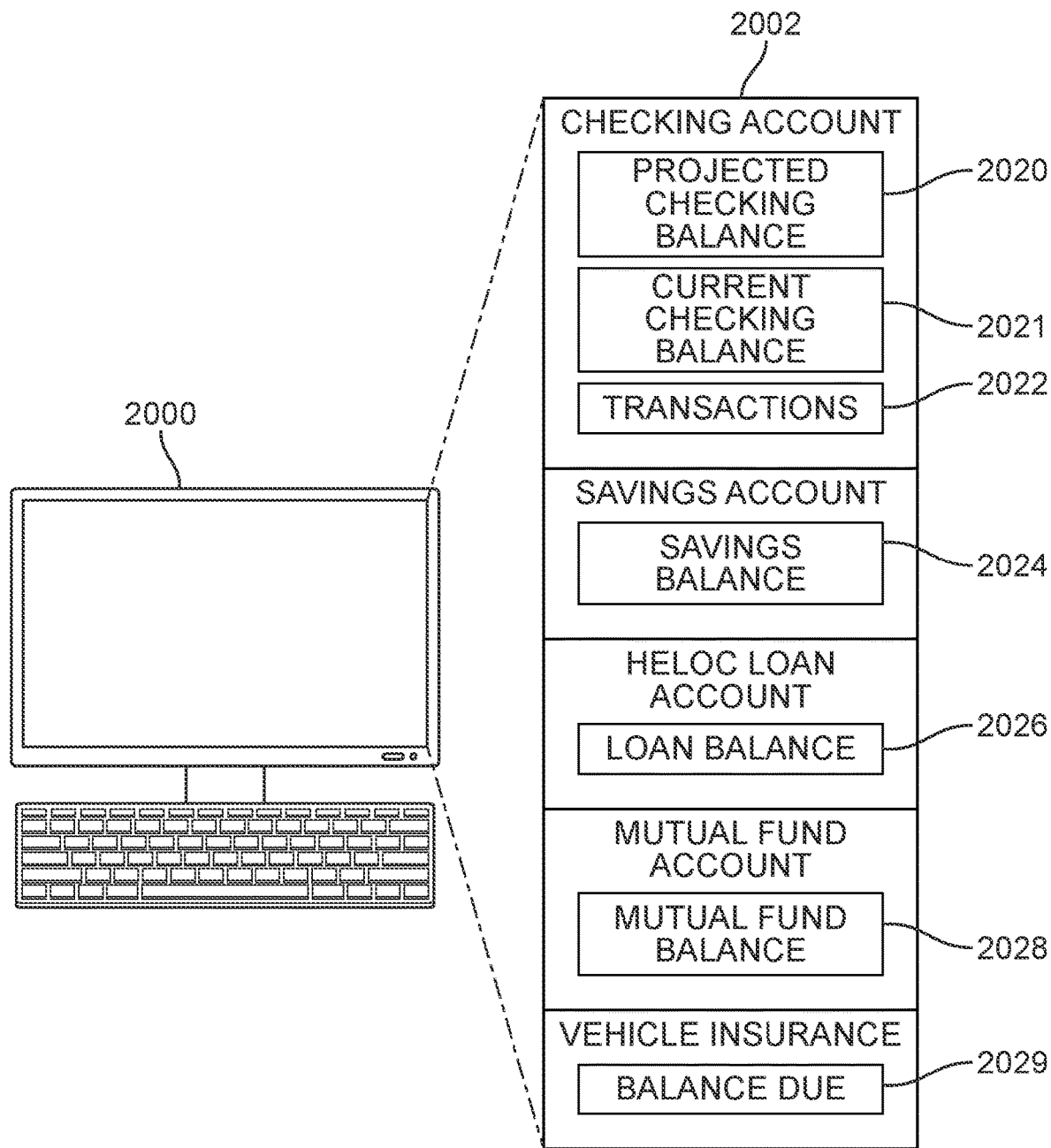
FIG. 20 is a schematic view of an account summary page, according to an embodiment.

FIG. 20 is a schematic view of an account summary page 2002 that may be served on a webpage running on computing system 2000. Account summary page 2002 may be used by a banking customer to track their account information across different banking products. The account information can include account balances, as well as other kinds of financial information. Although this example depicts an account summary page displayed within a web browser, in other embodiments, account summary information could be displayed in a mobile application running on a smartphone or tablet.

In the example shown in FIG. 20, account summary page 2002 provides account information about a customer's checking account, savings account, home equity line of credit (HELOC) loan account, and mutual fund account. Additionally, account summary page 2002 includes vehicle insurance account information. In some cases, these various banking and insurance products may be offered by a single financial institution. More specifically, account summary page 2002 provides a customer with a current checking balance 2021, and a projected checking balance 2020. The current checking balance 2021 may be calculated based on information about all confirmed transactions to date, while projected checking balance 2020 may be calculated from not only confirmed transactions, but also scheduled/planned transactions. Account summary page 2002 may also include checking account transaction details 2022, a savings balance 2024, a loan balance 2026, a mutual fund balance 2028, and a balance due 2029 for a vehicle insurance policy.

Each of these data fields provided within account summary page 2002 may be determined dynamically when the customer loads the corresponding website or page within a mobile application. More specifically, to determine a value for each data field may require retrieving data, parsing data, and performing calculations on data from multiple different sources. These processes can be resource intensive and may increase loading times of a webpage or mobile application.

Figure 21:
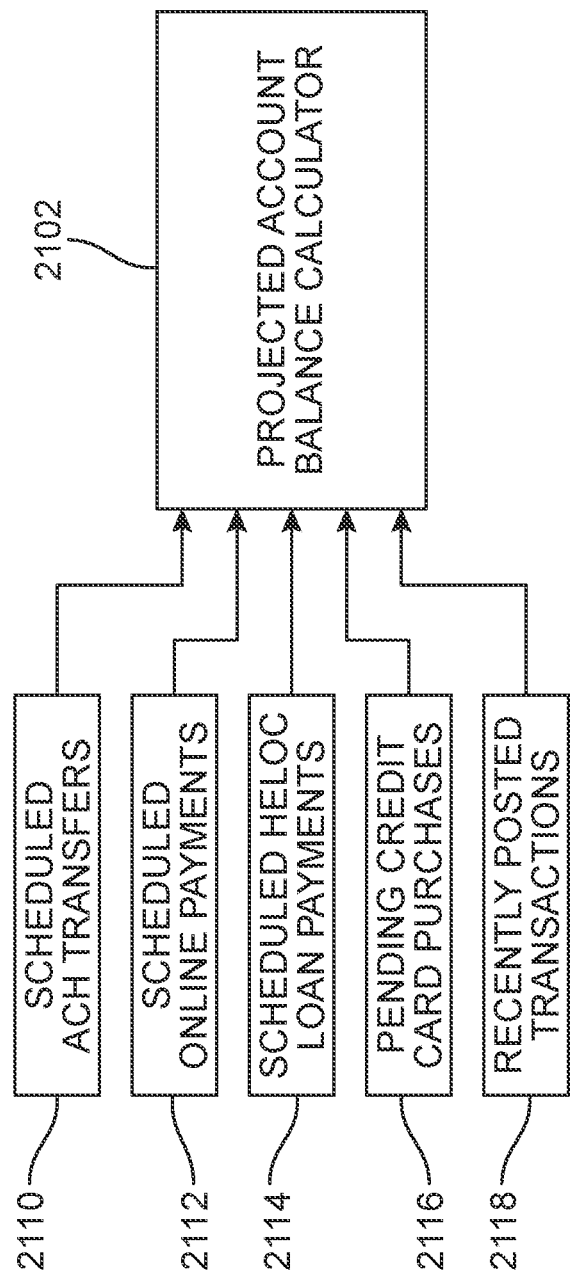
FIG. 21 is a schematic view of a projected account balance calculator along with exemplary inputs, according to an embodiment.

FIG. 21 is a schematic view of various inputs that may be needed to calculate a projected account balance. These may represent inputs required to compute a projected account balance for a variety of different banking and/or insurance products, such as checking accounts, savings accounts, loan accounts, mutual fund or other stock accounts, or insurance accounts.

As seen in FIG. 21, various inputs are fed into a projected account balance calculator 2102. Calculator 2102 may comprise one or more software components for computing a current balance based on all pending and posted transactions, and/or a projected future balance based on pending, posted as well as scheduled transactions. In this example, inputs to calculator 2102 may include scheduled ACH transfers 2110, scheduled online payments 2112, scheduled HELOC loan payments 2114, pending credit card purchases 2116, and recently posted transactions 2118. Because different inputs are generated by different systems, including various financial transaction processing systems, it may be difficult to acquire all the information quickly and efficiently.

Figure 22:
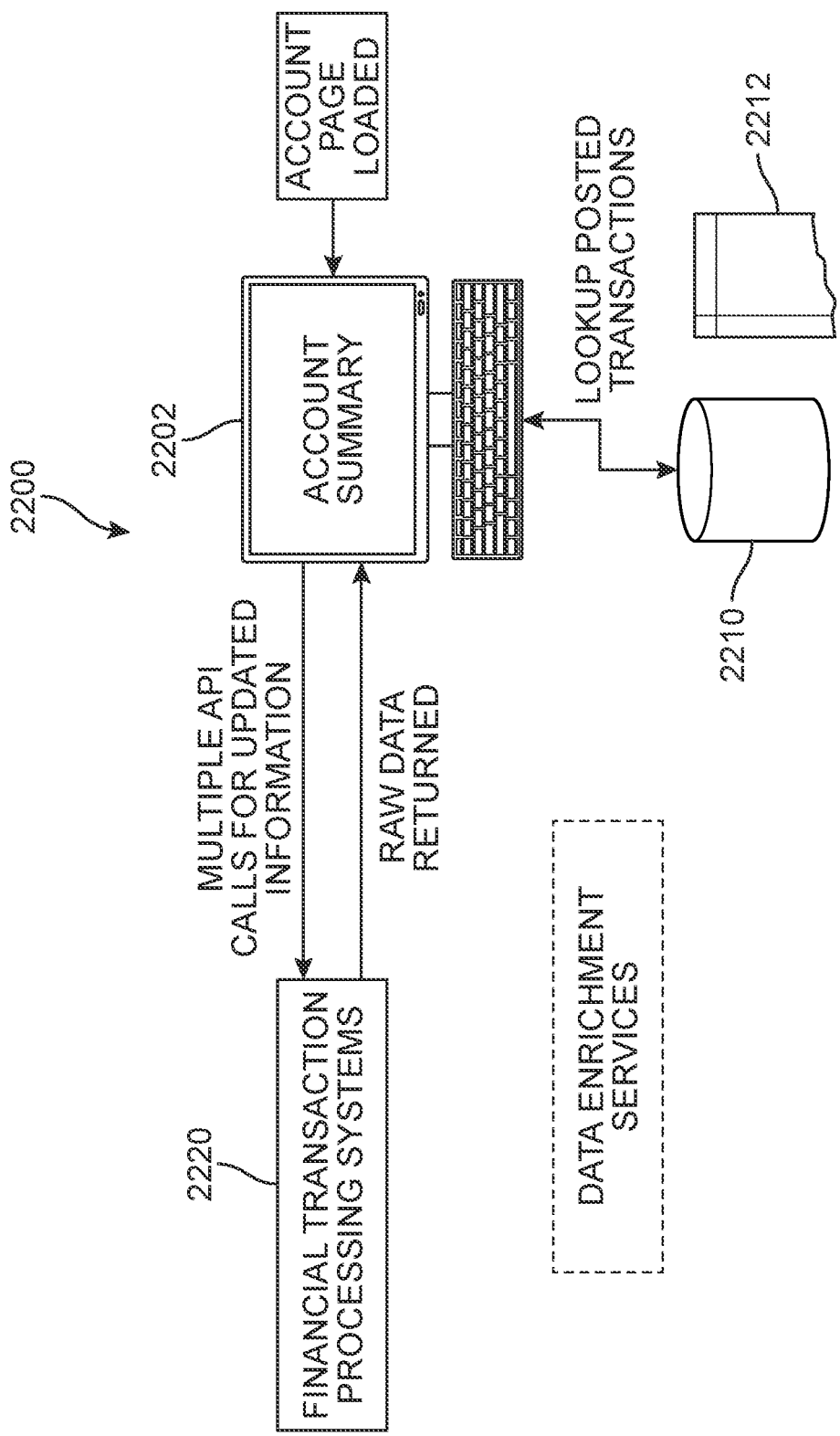
FIG. 22 is a schematic view of an embodiment of a system for providing account summary information by making API calls to financial transaction processing systems.

FIG. 22 is a schematic view of one embodiment of a system 2200 for retrieving transaction information in order to populate an account summary 2202. In this configuration, some information may be available in transaction records provided within a datastore 2210. For example, posted transactions may be retrieved by querying datastore 2210. However, other information for scheduled and pending transactions may be generated at, and stored within, one or more financial transaction processing systems 2220. In other words, the transaction records 2212 stored in datastore 2210 only provide a partial view of account activity, since they do not include information about scheduled or other pending transactions.

With system 2200, data from financial transaction processing systems 2220 must be fetched via customized APIs, or general HTML requests. Moreover, to ensure that all possible transactions are accounted for, a call must be made to each financial transaction processing system that might have relevant transaction data. This results in a string of separate API calls, which increases latency and requires substantial computational resources. Furthermore, the exemplary system 2200 shown in FIG. 22 is not able to obtain enriched data for scheduled transactions, since data enrichment is generally performed after a scheduled transaction has been made. In some cases, data associated with pending transactions may also not be enriched. Thus, account summary 2202 is only able to retrieve raw data for many types of scheduled and pending transactions.

Figure 23:
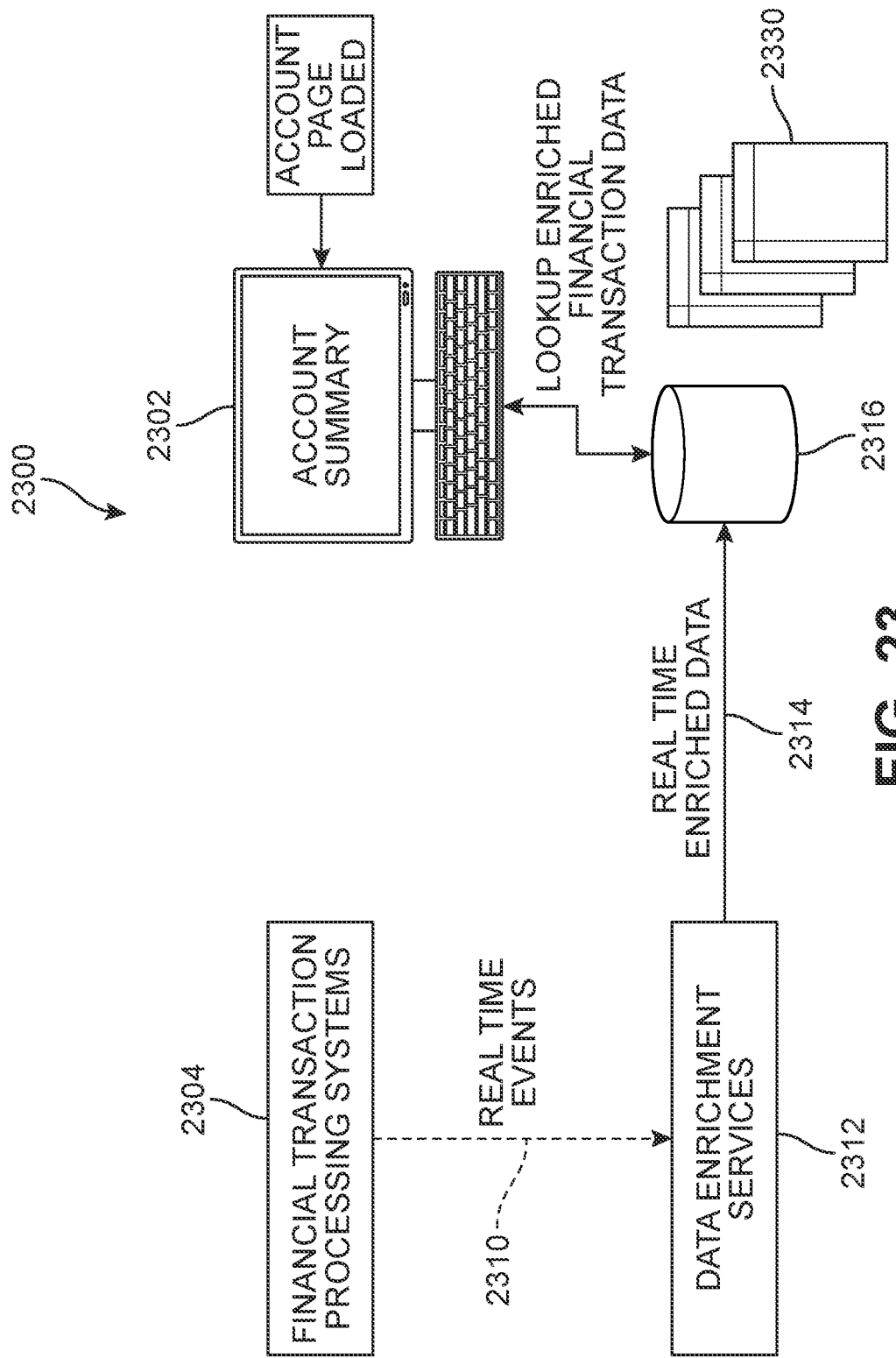
FIG. 23 is a schematic view of a system for providing account summary information that uses an event driven architecture, according to an embodiment.

FIG. 23 is a schematic view of another embodiment of a system 2300 for retrieving transaction information in order to populate account summary 2302. System 2300 utilizes the event driven architecture described above and shown, for example, in FIGS. 5-6. Specifically, financial transaction processing systems 2304 generate real time events 2310. These real time events correspond to changes in the state of a transaction as it is processed by various systems. In response to these events, transaction data can be enriched using data enrichment services 2312. Then, real time enriched data 2314 is captured in one or more datastores 2316. Because real time data is immediately enriched and stored for querying, transaction records 2330 provide a comprehensive view of account activity. This data can be retrieved from datastores 2316 to quickly determine account information, including current account balances and/or projected future balances.

Comparing the embodiments in FIGS. 22 and 23, it can be seen that the event drive architecture of the embodiment in FIG. 23 may provide lower latency compared to the embodiment of FIG. 22, since data can be queried directly from local datastores. By contrast, the embodiment in FIG. 22 requires many API calls to retrieve transaction data from multiple different processing systems. Since these calls are made at the time the account summary request is made (for example, when an account summary page is loaded), the summary information cannot be provided until all of the API calls have been made and responses received, thereby increasing latency.

Furthermore, it may be seen that the event driven architecture of the embodiment in FIG. 23 can improve the accuracy of account summary data as compared to the embodiment of FIG. 22. Specifically, transaction data can be enriched in real time in response to transaction events from processing systems. This means that queried data is already enriched. Because enriched data has already been cleaned, categorized and verified, this results in more accurate and consistent data than the raw data that is retrieved directly from processing systems using API calls as in the embodiment of FIG. 22.

Figure 24:
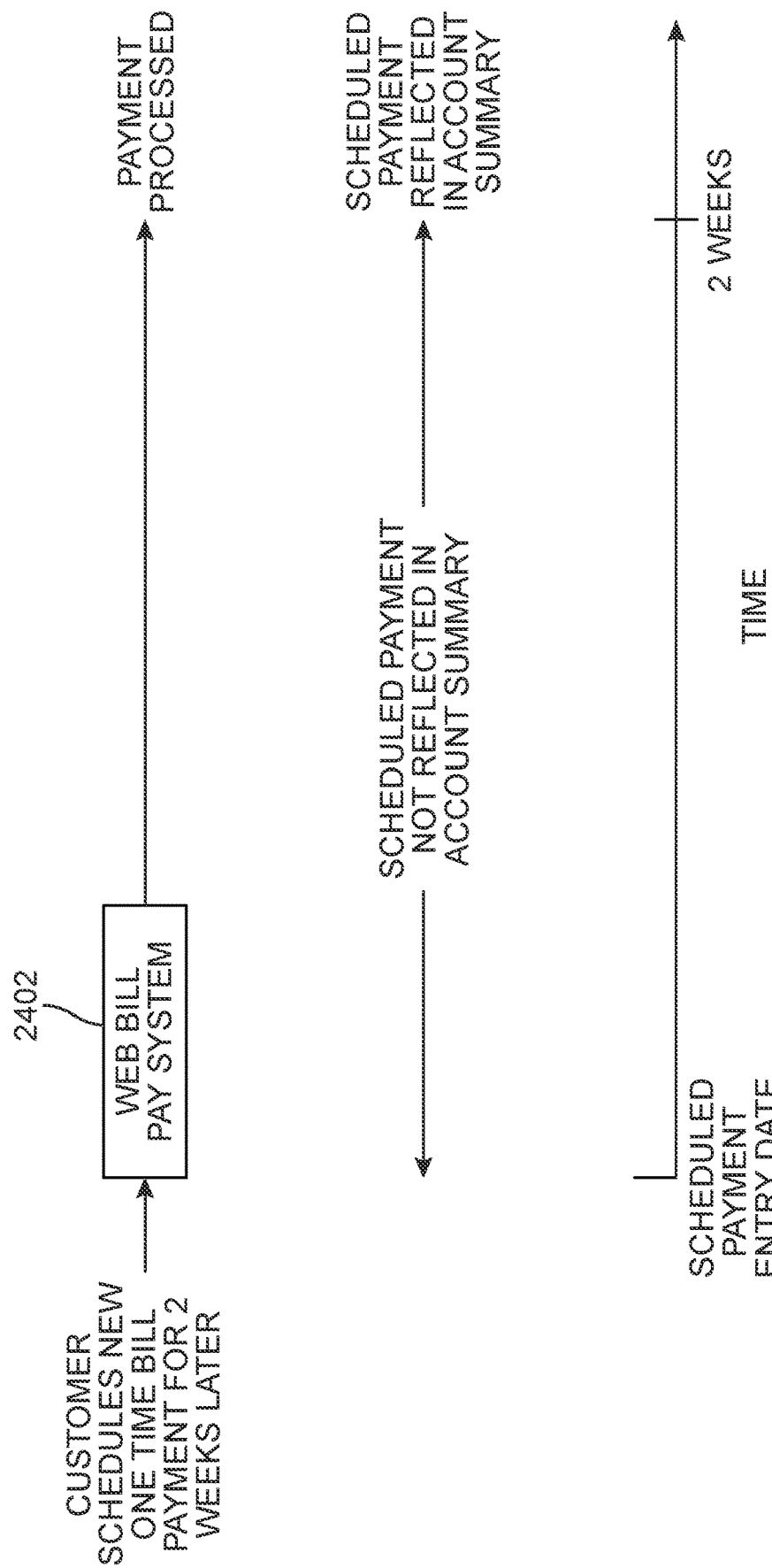
FIG. 24 is a schematic view of a chart illustrating when scheduled payment information is available using the system of FIG. 22.
Figure 25:
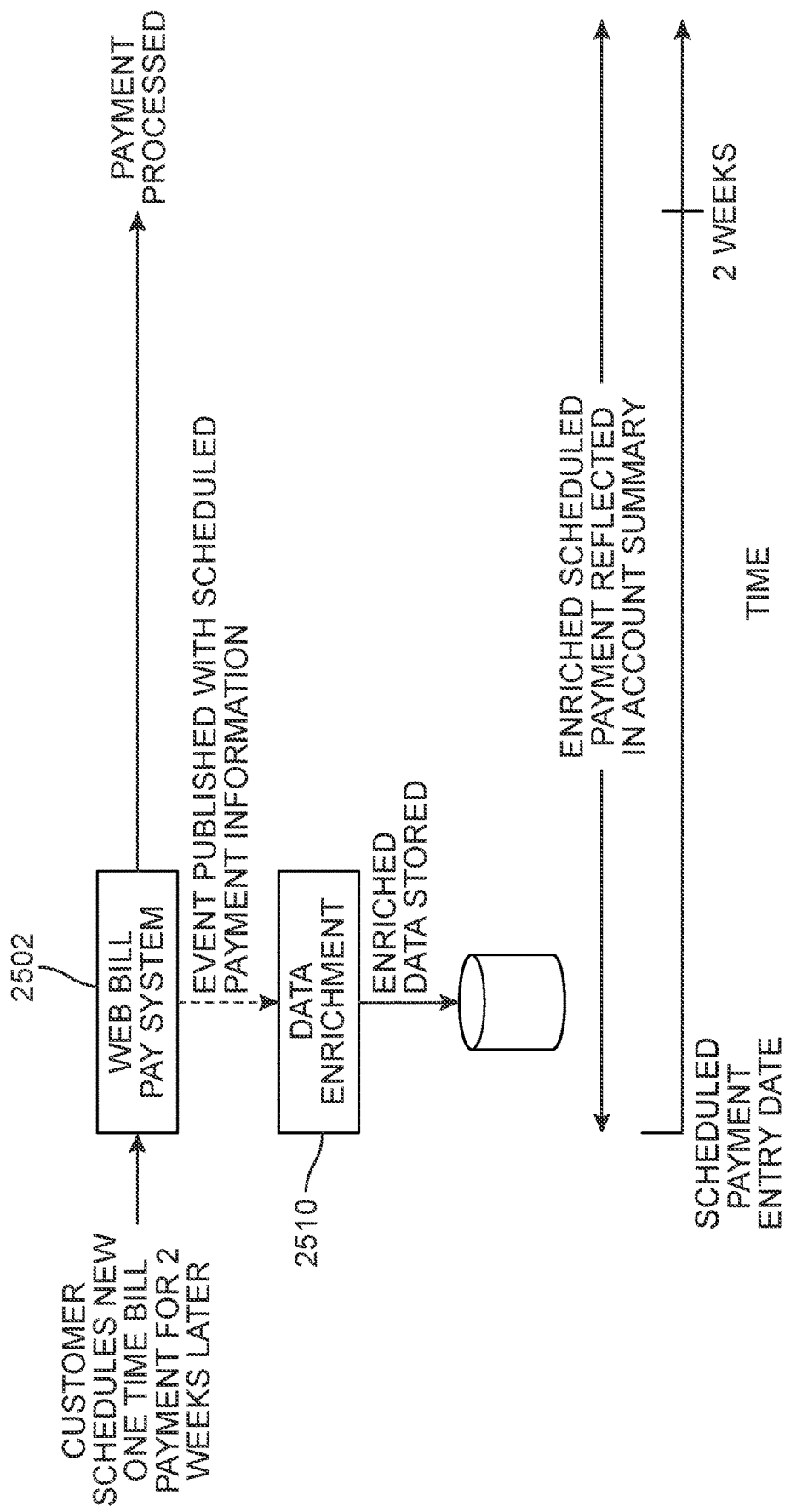
FIG. 25 is a schematic view of a chart illustrating when scheduled payment information is available using the system of FIG. 23.

FIGS. 24-25 are intended to highlight additional distinctions between an architecture such as that shown in FIG. 22 and an event driven architecture as in FIGS. 5-6 and FIG. 23. In the first case, depicted in FIG. 24, a customer may schedule a new one-time bill payment using a web bill pay system 2402. Specifically, the customer has scheduled a payment to occur on a date that is two weeks after the entry date for the scheduled payment. Unless a query is made to the web bill pay system, an account system may not be aware of the scheduled payment. Therefore, the scheduled payment may not be reflected in the account summary (include, for example, a projected future account balance) during the two-week period between the time the scheduled payment was entered and the time the scheduled payment is initiated. Even if a query is made during this time to obtain a list of scheduled payments, the data will be in a raw format and not enriched, as the enrichment process generally occurs after a payment has posted.

In the embodiment shown in FIG. 25, which reflects an event driven architecture, as soon as a new scheduled payment is entered by a customer, the web bill pay system 2502 publishes a new event with the scheduled payment information. This event triggers a process 2510 to enrich the scheduled transaction data. This data can then be stored, either in a temporary datastore, or in a long-term storage system, depending on the state of the transaction. In this case, this enriched scheduled payment information is reflected in the account summary as soon as the scheduled payment entry is made in the web bill pay system 2502.

The event driven system of FIG. 25 therefore provides a more accurate picture of account balances and other account information at all times, compared to the system of FIG. 24, since there is substantially no lag in obtaining enriched real time transaction data after payments are entered and/or initiated.

The event driven architecture described above may facilitate notifications that allow customers to be informed about new purchases in real (or near real) time. Such notifications could be useful, for example, to a couple that shares a checking account and is trying to operate within a budget for various purchasing categories (such as groceries, gas, etc.). For example, real time notifications about new purchases, including the amount of the purchase and the purchase category could be useful for managing budgets.

Figure 26:
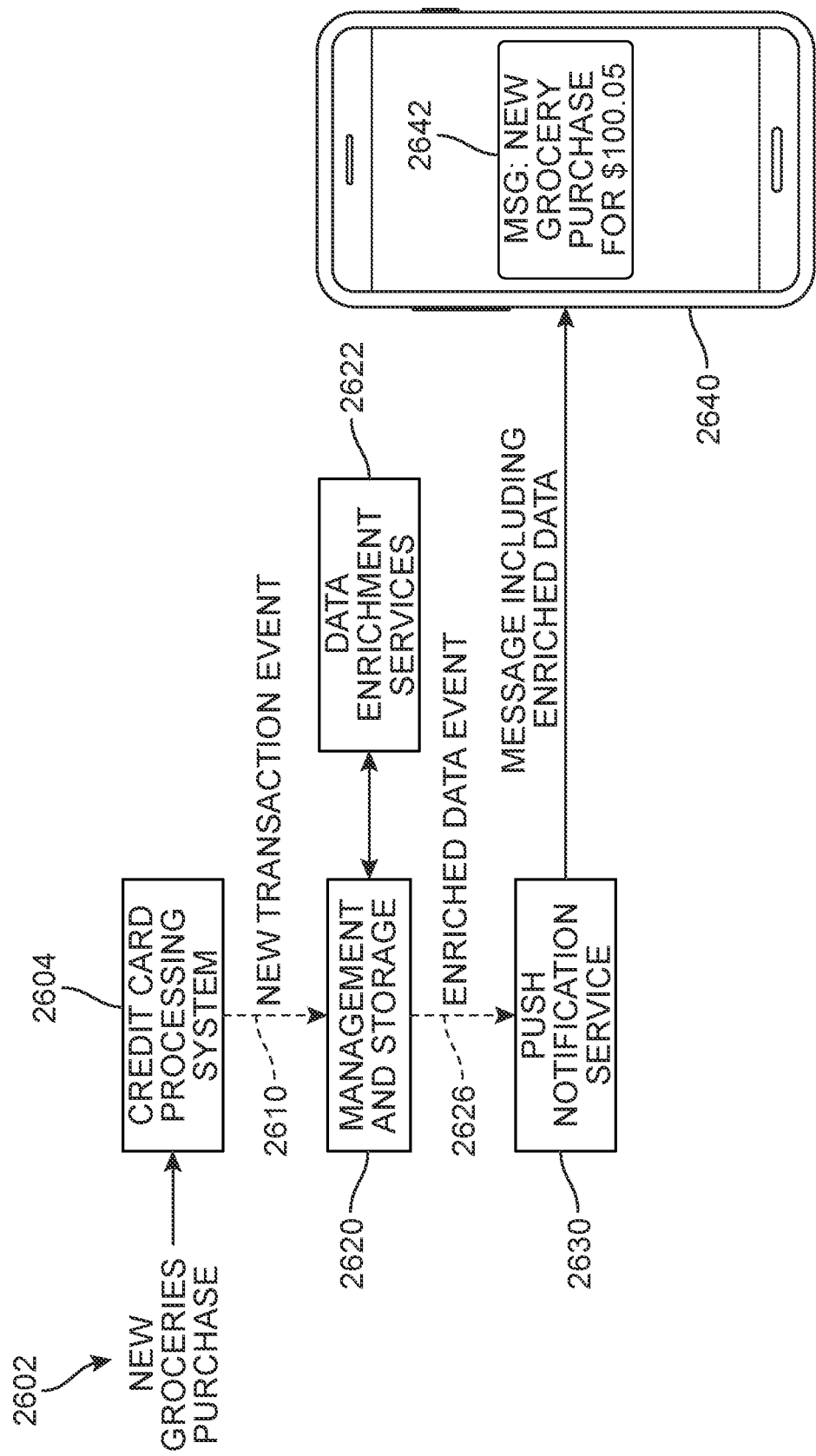
FIG. 26 is a schematic view of a system for providing real time notifications of account information, according to an embodiment.

FIG. 26 is a schematic view of a process for notifying customers about account changes in response to real time transaction events. In the example depicted in FIG. 26, a new groceries purchase 2602 at a merchant is processed by a credit card processing system 2604. As it preforms its usual processing tasks, credit card processing system 2604 also publishes a new transaction event 2610 to an event stream. This event is detected by a management and storage system 2620. Management and storage system 2620 may then make a request to enrich the transaction data associated with the transaction event using data enrichment services 2622. Once the data has been enriched, management and storage system 2620 publishes an enriched data event 2626 to an event stream.

As seen in FIG. 26, a push notification service 2630 may listen for, and detect, new enriched data events. Upon receiving enriched data event 2626, push notification service 2630 may send a message 2642 including enriched data to a user device 2640. In this case, the message includes information about the new grocery purchase. Specifically, the message includes the category of the purchase ("grocery") and an amount ("$100.05"). This detailed information allows a user to make better decisions about spending since they are alerted in real time about ongoing spending with the account across a variety of different purchasing categories.

Figure 27:
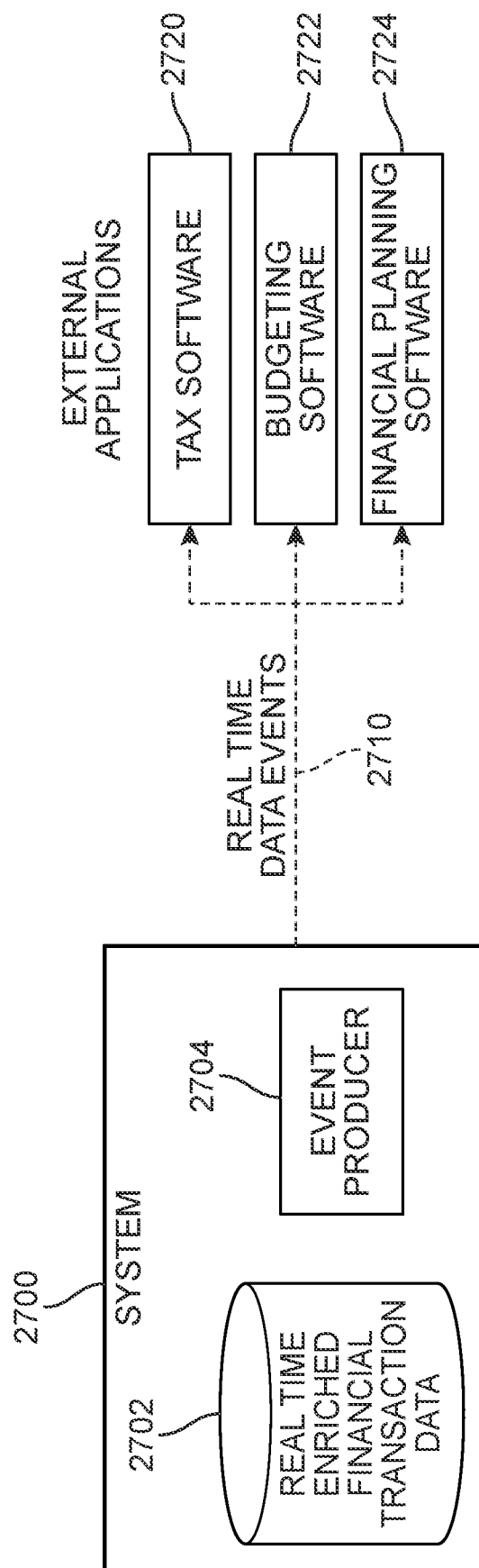
FIG. 27 is a schematic view of a system that can provide real time enriched financial transaction data to one or more external applications, according to an embodiment.

The event driven architecture described above may also be used to provide real time transaction data events to external applications. As seen in FIG. 27, a system 2700 includes a set of real time enriched financial transaction data 2702 and an event producer 2704. System 2700 uses event producer 2704 to publish real time data events 2710 to an event stream. These real time data events 2710 can then be consumed by multiple external applications, including, but not limited to: tax software 2720, budgeting software 2722, and financial planning software 2724. This configuration allows external applications to receive, process, and take actions based on real time, or near real time, data.

The embodiments may enable real time fraud detection by leveraging enriched financial transaction data that is pushed to an event stream in real time. Specifically, the latest change in state for every kind of transaction, including scheduled, pending, and posted transactions can be pushed to an event stream and processed immediately by a fraud detection system.

Figure 28:
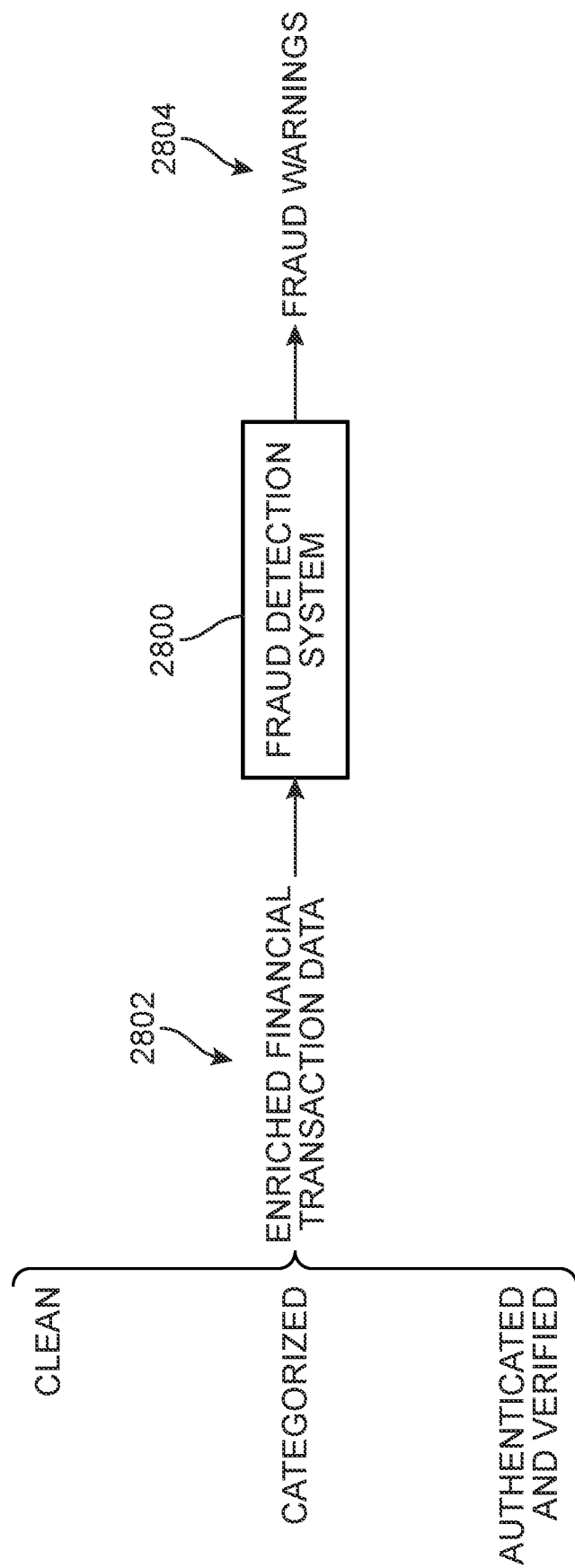
FIG. 28 is a schematic view of a fraud detection system that uses enriched financial transaction data, according to an embodiment.

FIG. 28 is a schematic view of a fraud detection system 2800 along with inputs to, and outputs of, the system. A fraud detection system may comprise any set of software, algorithms, and/or processes that can be used to analyze data and detect instances of potential fraud and/or other anomalous behavior. Exemplary techniques that could be incorporated into a fraud detection system include, but are not limited to: clustering and classification techniques, time series analyses, anomaly detection techniques, fraud detection algorithms incorporating neural networks, as well as other known fraud detection techniques.

Fraud detection system 2800 receives enriched financial transaction data 2802 as input. If fraud is suspected for one or more transactions, fraud detection system 2800 may output one or more fraud warnings 2804. Enriched financial transaction data 2802 may be clean (including removing simple errors and applying a consistent format), categorized, authenticated and/or verified. These properties enable improved fraud detection over systems that use raw data. For example, using clean data helps reduce false positives that may occur due to data entry errors and/or discrepancies in formatting. Also, using categorized data allows a fraud detection system to look for differences among similar kinds of financial transaction data.

Figure 29:
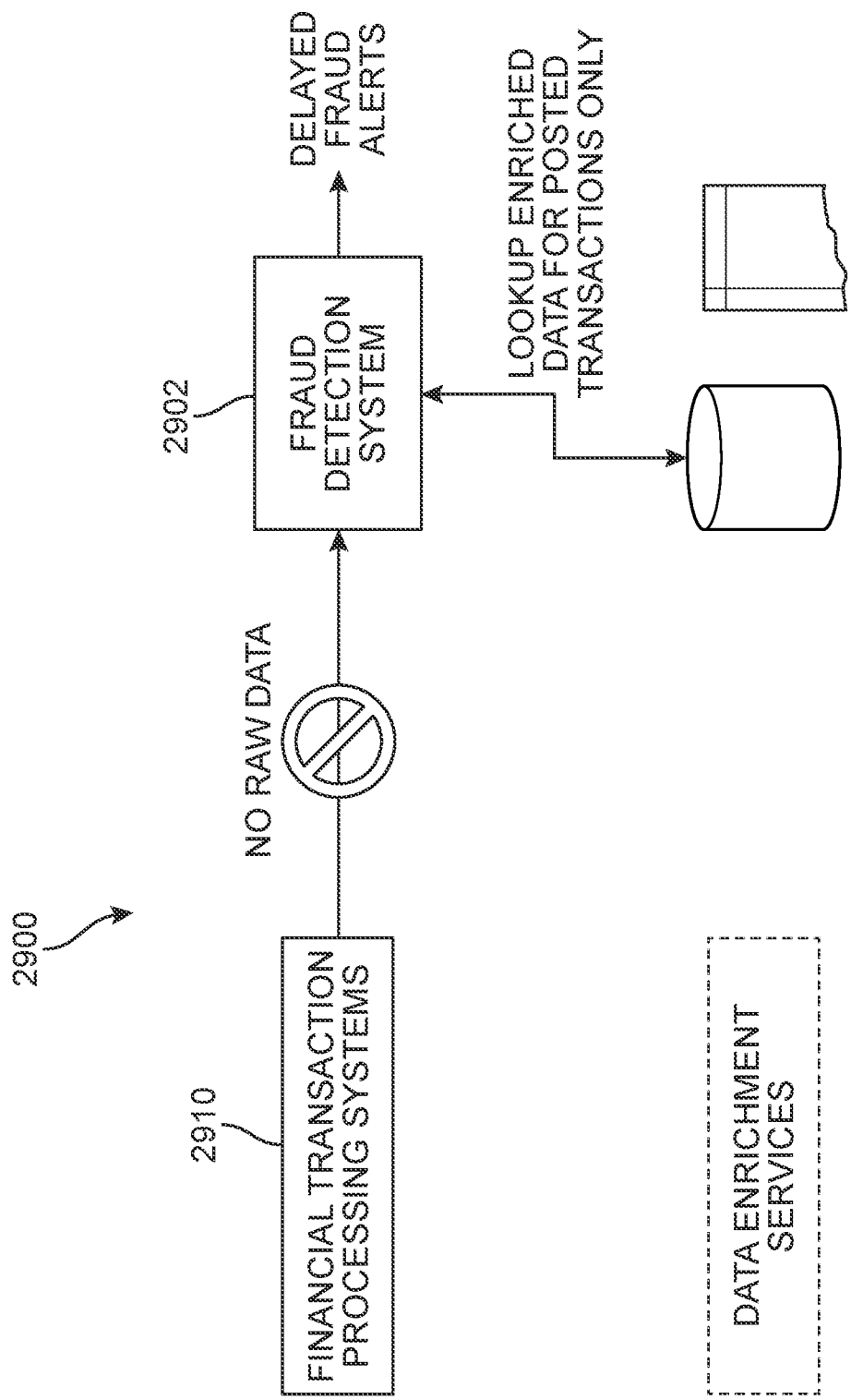
FIG. 29 is a schematic view of a system for detecting fraud in financial transactions that uses only data for posted transactions, according to an embodiment.

FIG. 29 depicts an architecture for a system 2900 that results in delayed fraud alerts. In this embodiment, a fraud detection system 2902 looks up enriched data for posted transactions only, since enriched data for pending transactions may generally be unavailable. Moreover, data is not queried from financial transaction processing systems 2910, since the returned data would be raw and less amenable to analysis.

Figure 30:
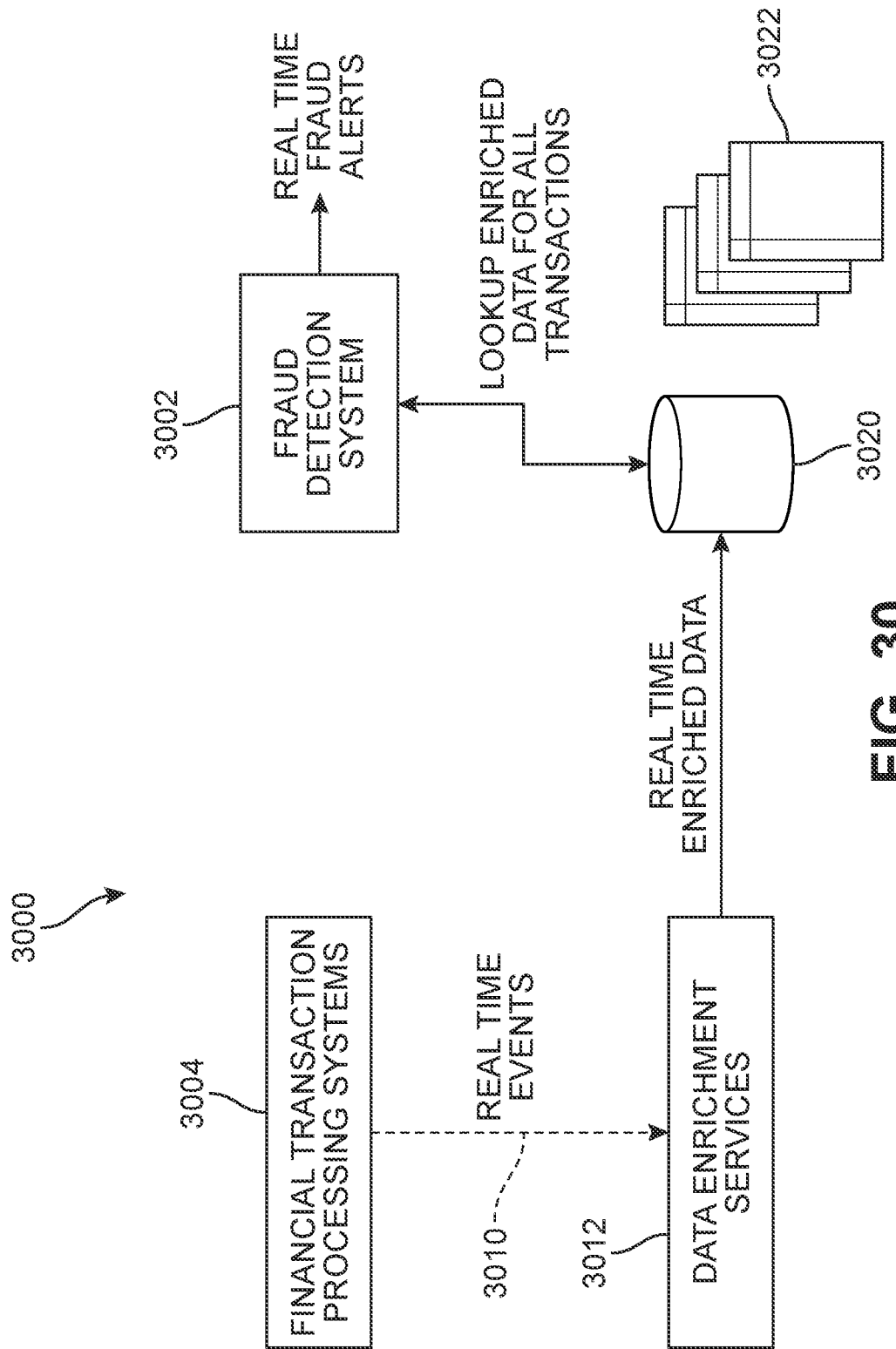
FIG. 30 is a schematic view of a system for detecting fraud in financial transactions that uses an event driven architecture to analyze enriched data for a variety of different transaction types, according to an embodiment.

By contrast to the architecture shown in FIG. 30, the architecture of a system 3000 shown in FIG. 30 facilitates real time fraud detection. As seen in FIG. 30, system 3000 utilizes the event driven architecture described above and shown, for example, in FIGS. 5-6. Specifically, financial transaction processing systems 3004 generate real time events 3010. In response to these events, transaction data can be enriched using data enrichment services 3012. Then, real time enriched data is captured in one or more datastores 3020. Because real time data is immediately enriched and stored for querying, enriched data for all transactions 3022, including scheduled and pending transactions, can be retrieved by fraud detection system 3002 at any point in the transaction lifecycle.

Comparing the embodiments in FIGS. 29 and 30, it can be seen that the event drive architecture of the embodiment in FIG. 30 may provide real time fraud alerts, while the embodiment in FIG. 29 produces delayed fraud alerts. Specifically, fraud detection system 2902 in FIG. 29 cannot analyze scheduled or pending transaction events, since these events have yet to be enriched. This results in a lag time between when payments are initiated and when they can be analyzed for fraud.

Figure 31:
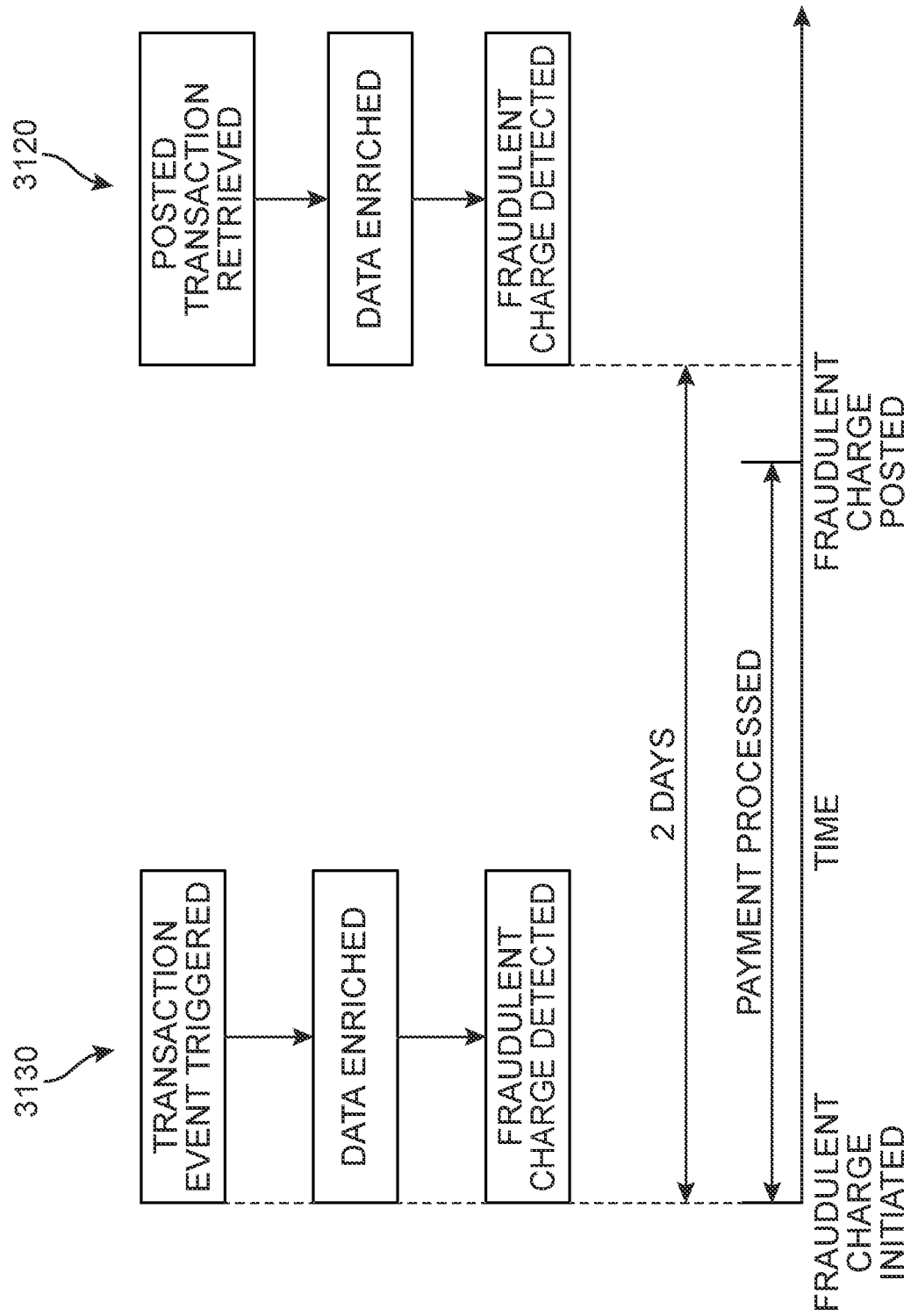
FIG. 31 is a schematic view of a chart illustrating the difference in time for two different fraud detection systems to detect a fraudulent charge, according to an embodiment.

This delay in fraud detection is depicted schematically in a chart in FIG. 31. In the example of FIG. 31, a fraudulent charge is initiated at a first time and then the fraudulent charge is posted at a second time. In this example, it takes almost two days for the charge to be processed and finally posted. Using a system 3120, the fraudulent charge cannot be retrieved until the charge has been posted. Once posted, the data is enriched and then the fraudulent charge can be detected. By contrast, an event driven system 3130 enables fraud detection in real time. Specifically, as soon as the fraudulent charge is initiated a transaction event is triggered by a financial transaction processing system (such as a credit card processing system). In response to the transaction event, system 3130 immediately enriches the data, and the fraudulent charge can be detected nearly immediately. As seen in FIG. 31, there is a lag of approximately 2 days between when system 3130 is able to detect the fraudulent charge and when system 3120 is able to detect the fraudulent charge.

By detecting fraud sooner, the exemplary event drive system can help reduce the total monetary losses caused when fraudulent charges are allowed to continue for one or more days. For example, consider a situation where a customer's credit card information is stolen by a fraudulent party. Using the system 3120 of FIG. 31, the fraudulent party could continue to make additional fraudulent charges between when the first fraudulent charge is initiated and when fraud is first detected, which may take several days. However, using the system 3130 of FIG. 31, fraudulent charges may be detected substantially sooner than several days. In some cases, the fraudulent charges may be made in real time. This significantly limits the number of additional fraudulent charges that can be made before fraud is detected and the credit card is deactivated.

Figure 32:
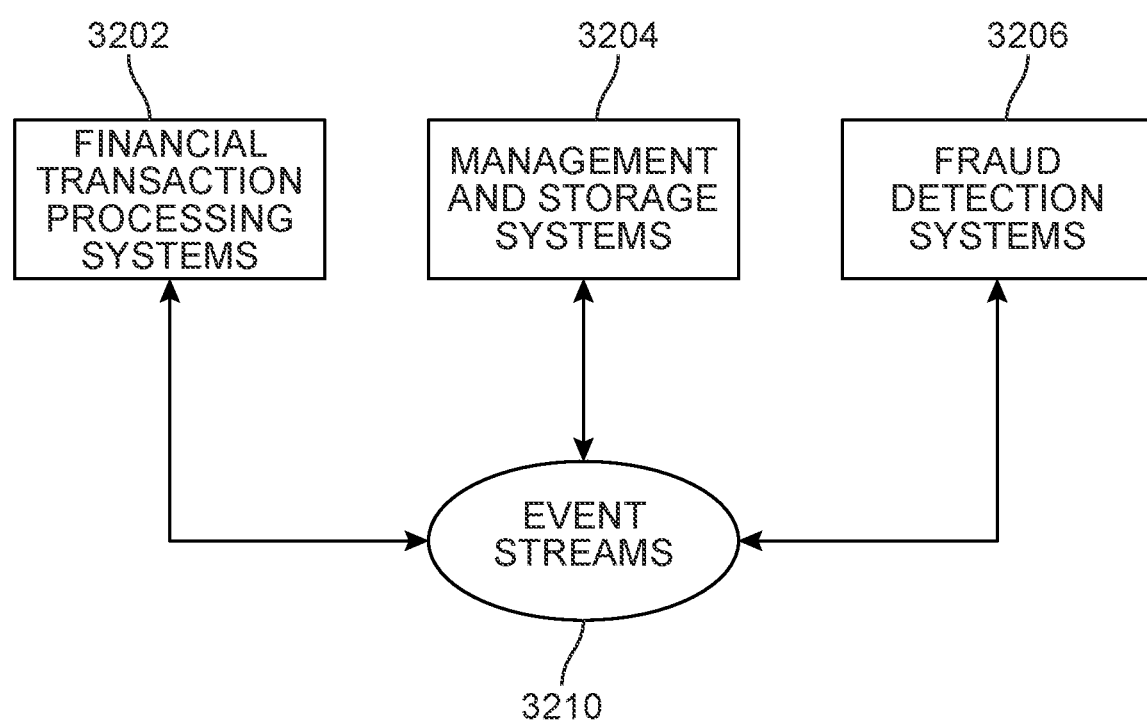
FIG. 32 is a schematic view of several systems that can communicate using an event stream, according to an embodiment.
Figure 33:
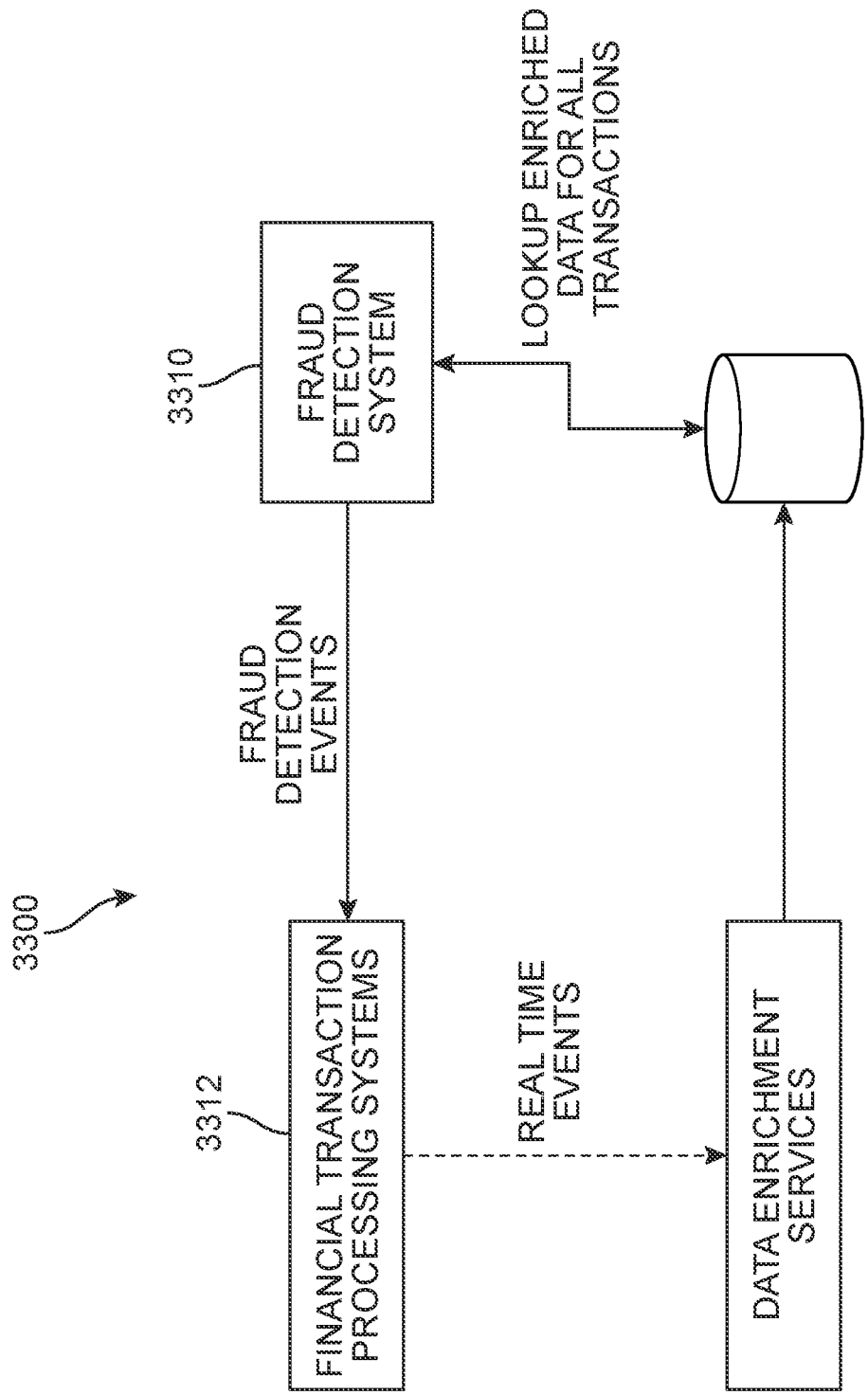
FIG. 33 is a schematic view of an embodiment of a fraud detection system that can publish fraud detection events to an event stream, according to an embodiment.

FIGS. 32-33 depict schematic views of an embodiment of a system where a fraud detection system can publish events to an event stream so that these events may be consumed by other components. As seen in FIG. 32, financial transaction processing systems 3202, management and storage systems 3204, and fraud detection systems 3206 may all consume messages from one or more event streams 3210. Additionally, each of these systems may publish events to one or more events streams 3210. That is, each of these systems may be configured with event listeners and event producers, as in the examples shown in FIG. 6.

FIG. 33 depicts a schematic view of a system 3300 with an event driven architecture. In this embodiment, fraud detection system 3310 can publish fraud detection events to one or more event streams. These event streams can then be consumed by, for example, financial transaction processing systems 3312. The architecture provides feedback that allows the financial transaction processing systems to have information about the potentially fraudulent activity. Since the fraudulent activity may originate at one or more of these financial transaction processing systems, this feedback may allow the processing systems to take additional precautions or otherwise mitigate against fraudulent activity. In some cases, the fraudulent activity may originate at a point of sale (POS), such as a merchant's payment terminal. In this case, a processing system, such as a credit card processor, could receive fraud information from the event stream and inform the POS of the potentially fraudulent activity and/or block future charges from the merchant until the fraudulent charges have been resolved.

In another embodiment, a fraud detection system could be integrated into a financial transaction processing system. In such an embodiment, enriched transaction data could be published by any other component in the system to an event stream and consumed by the processing system with fraud detection capabilities.

The event driven architecture described above may facilitate notifications that allow customers to be informed about fraud (for example, fraudulent credit card charges) in real (or near real) time. Real time fraudulent notifications may allow customers to confirm whether or not suspected charges are in fact fraudulent. These notifications may also allow customers to take immediate action by canceling a credit or debit card associated with a fraudulent charge before further fraudulent charges can be made by a fraudulent party.

Figure 34:
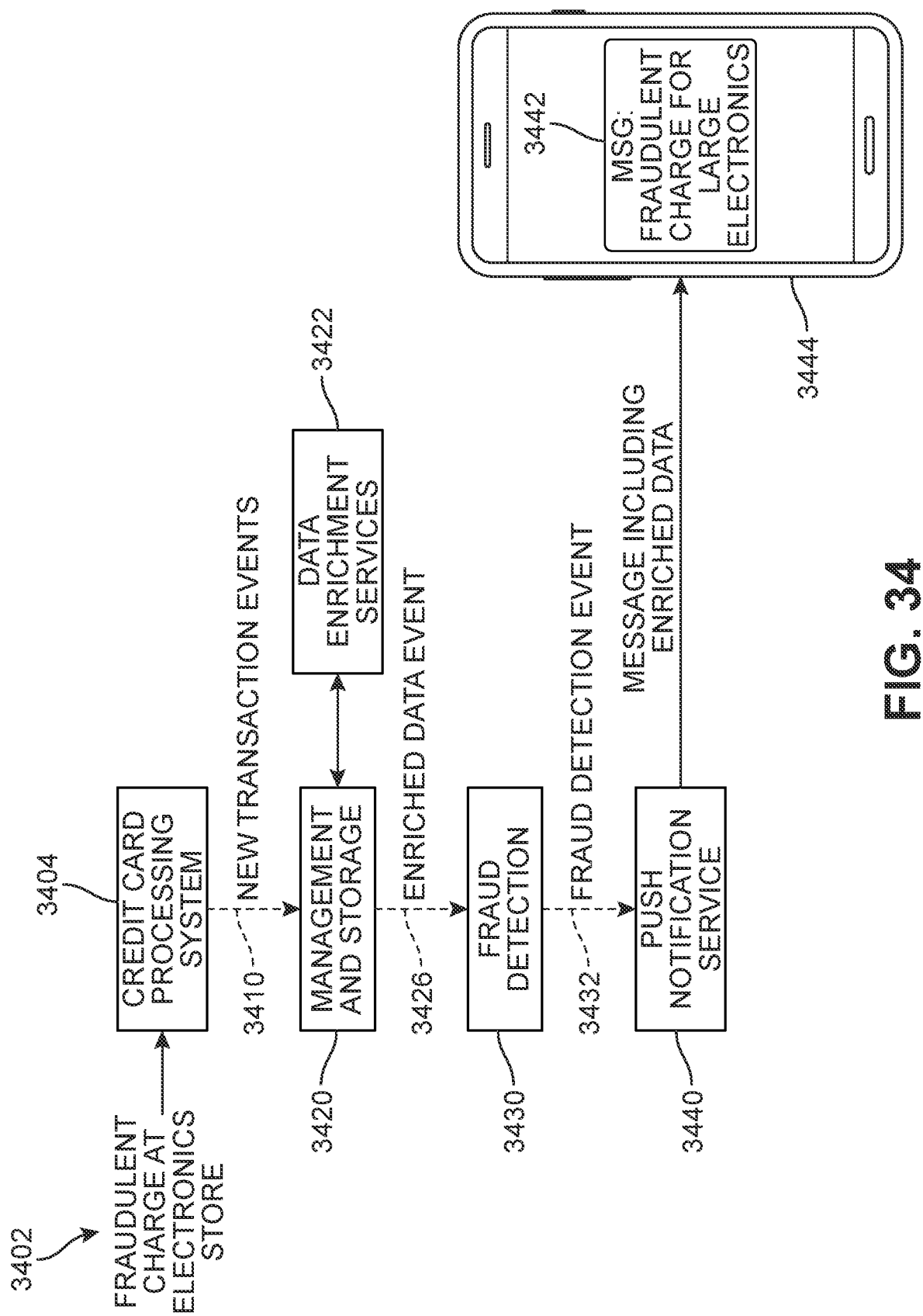
FIG. 34 is a schematic view of a system that pushes real time fraud notifications based on published events, according to an embodiment.

FIG. 34 is a schematic view of a process for notifying customers about potentially fraudulent activity in response to real time transaction events. In the example depicted in FIG. 34, a fraudulent charge 3402 is made at an electronics store using a stolen credit card number. Charge 3402 is processed by a credit card processing system 3404. As it preforms its usual processing tasks, credit card processing system 3404 also publishes a new transaction event 3410 to an event stream. This event is detected by a management and storage system 3420. Management and storage system 3420 may then make a request to enrich the transaction data associated with the transaction event using data enrichment services 3422. Once the data has been enriched, management and storage system 3420 publishes an enriched data event 3426 to an event stream. A fraud detection system 3430 detects the enriched data event and analyzes a batch of recently enriched transaction data including charge 3402. If fraudulent activity is detected, fraud detection system 3430 may publish a fraud detection event 3432.

As seen in FIG. 34, a push notification service 3440 may listen for, and detect, new fraud detection events. Upon receiving fraud detection event 3432, push notification service 3440 may send a message 3442 including enriched data to a user device 3444. In this case, the message includes information about the fraudulent charge. Specifically, the message indicates that a fraudulent charge has been made for a large electronics purchase. Here, the purchasing category is part of the enriched transaction data. If the user has recently made a large electronics purchase, he or she can inform the system that this is most likely not a fraudulent charge. If the user has not made any large electronic purchases, he or she can inform the system that this is likely a fraudulent charge so that further actions can be taken. For example, the associated credit or debit card could be immediately canceled. In some cases, a user could respond to a fraud notification within a messaging service, through a mobile application or web application.

Figure 35:
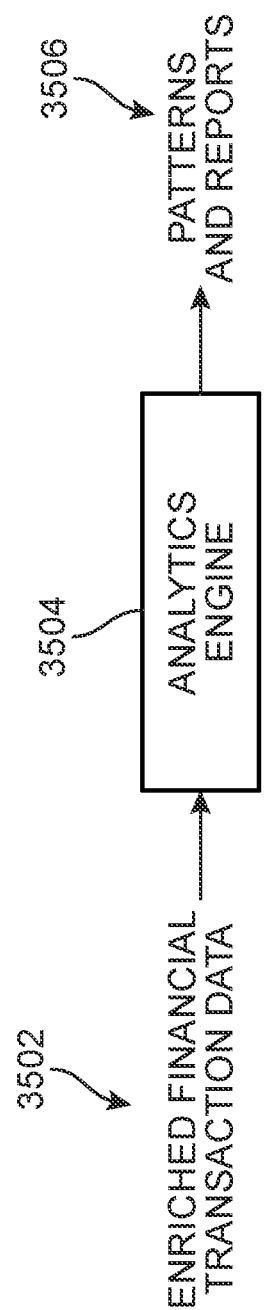
FIG. 35 is a schematic view of an embodiment of an analytics engine that uses enriched financial transaction data.

The exemplary systems and methods are not limited to use with fraud detection systems. The same principles could also be applied to a wide variety of data analytics systems and methods. In an exemplary embodiment depicted schematically in FIG. 35, enriched financial transaction data 3502 is fed into an analytics engine 3504 which could perform, for example, behavior based analytics. The output could include, for example, patterns and reports 3506. Thus, the exemplary systems and methods may facilitate real time data analytics of financial transaction data.

The embodiments may facilitate efficient account cancellation for a financial provider such as a bank. Specifically, enriched information for scheduled and pending transactions that have been published to an event stream can be used to determine the originating sources (for example, a merchant identification name/number) for all transactions associated with a particular account (for example, a specific checking account). This allows all scheduled and pending transactions associated with a specific account to be immediately canceled prior to closing the account. Without a record of the history of each transaction linked to an account, a bank may be forced to wait until all transactions have posted before closing the account.

Figure 36:
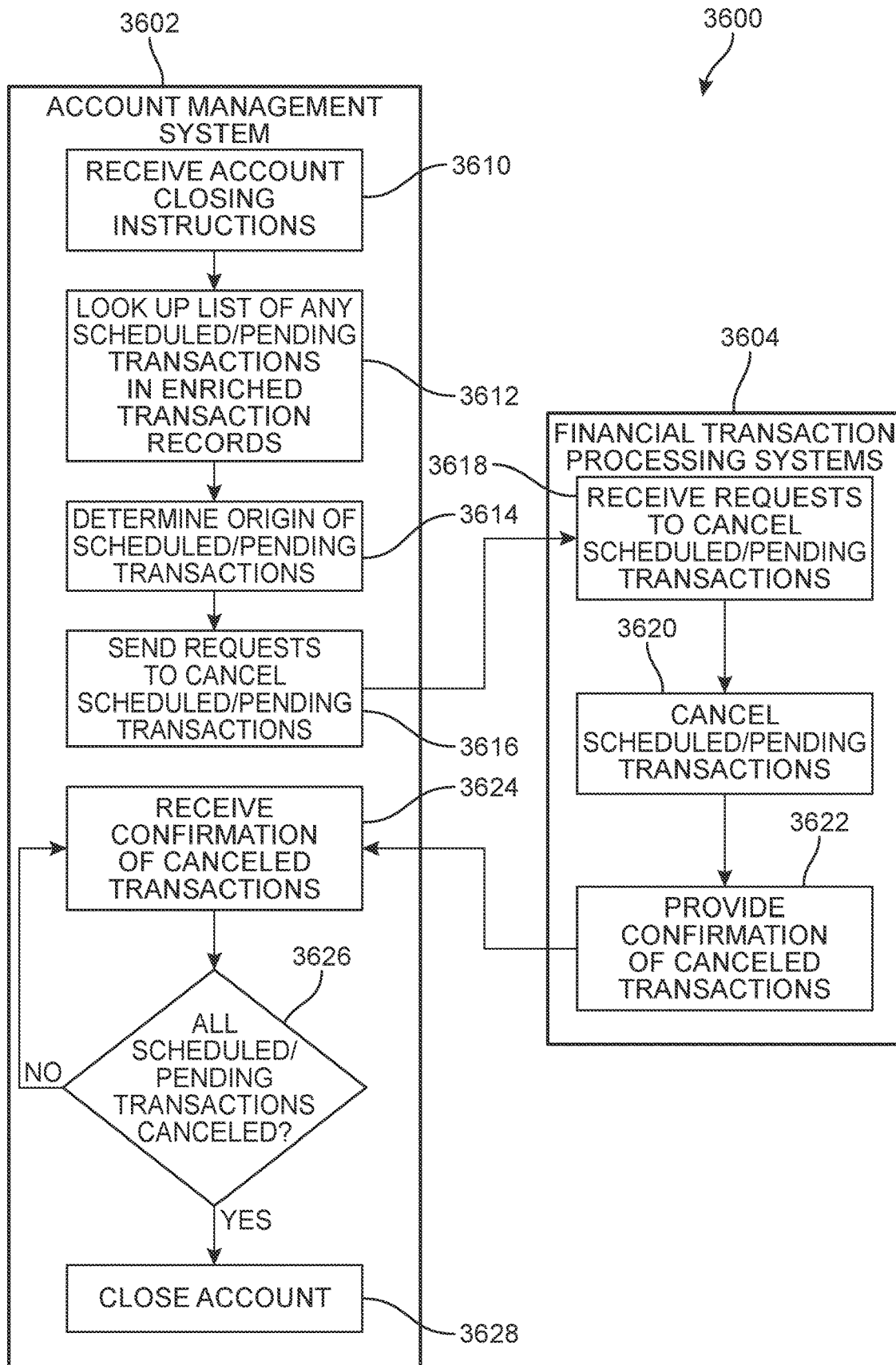
FIG. 36 is a schematic view of a process for cancelling a financial account using an account management system, according to an embodiment.

FIG. 36 is a view of a process 3600 for cancelling transactions prior to closing a financial account, such as a checking account. Some of these steps may be performed by an account management system 3602 and other steps may be performed by one or more financial transaction processing systems 3604.

In a first step 3610, account management system 3602 receives instructions to close an account, such as a checking account for a customer at a bank. Next, in step 3612, account management system 3602 looks up a list of any scheduled and/or pending transactions in the set of enriched transaction records. Using information from the enriched transaction records, account management system 3602 may determine the origin of each pending transaction, or the system responsible for processing the transaction, in step 3614. For example, account management system 3602 may identify the source of the transaction from the source data field 816 in the event record (see FIG. 8). Next, in step 3616, account management system 3602 may send the requests to cancel scheduled/pending transactions to one or more financial transaction processing systems 3604.

In step 3618, processing systems 3604 receive requests to cancel scheduled/pending transactions. In step 3620, processing systems 3604 cancel the scheduled/pending transactions. Next in step 3622, processing systems 3604 provide confirmation of canceled transactions to account management system 3602.

In step 3624, account management system 3602 receives confirmation of the canceled transactions. In step 3626, account management system 3602 determines if all scheduled/pending transactions have been canceled. If not, the system returns to step 3624 to continue receiving confirmation of canceled transactions. If so, the system proceeds to step 3628 to close the account.

Figure 37:
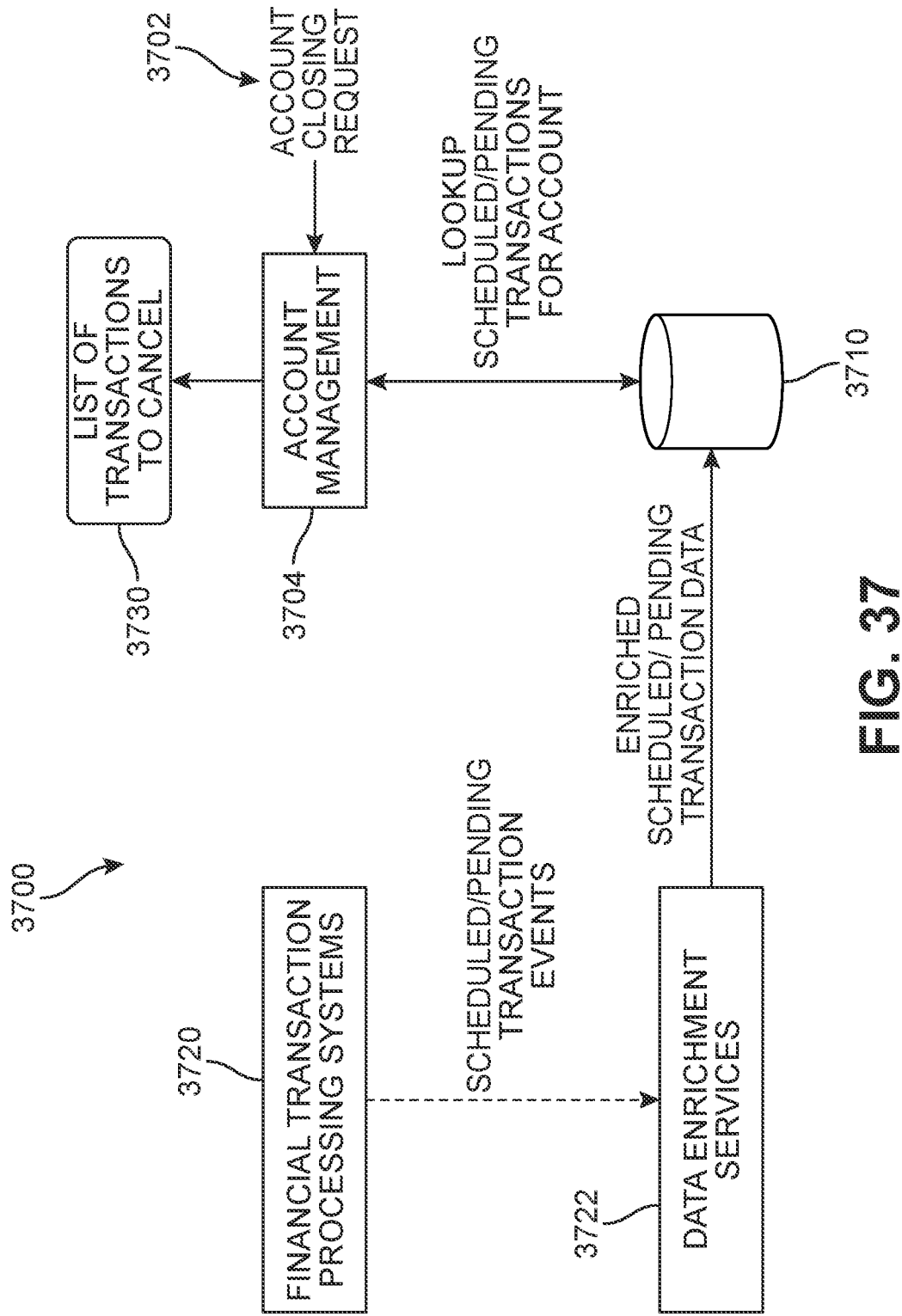
FIG. 37 is a schematic view of an account management system that uses an event driven architecture to identify ongoing transactions, according to an embodiment.

FIG. 37 is a schematic view of a system 3700 with an event driven architecture that enables the cancellation of scheduled or otherwise pending transactions prior to closing an account. As seen in FIG. 37, upon receiving an account closing request 3702, an account management system 3704 may lookup scheduled/pending transactions for the account. This information can be retrieved from the enriched transaction records maintained in a datastore 3710. The enriched scheduled/pending transaction data is updated in real time based on published events from financial transaction processing systems 3720 and serviced by data enrichment services 3722. Using the enriched transaction data, account management system 3704 can generate a list of transactions 3730 that need to be canceled before the account can be closed.

Figure 38:
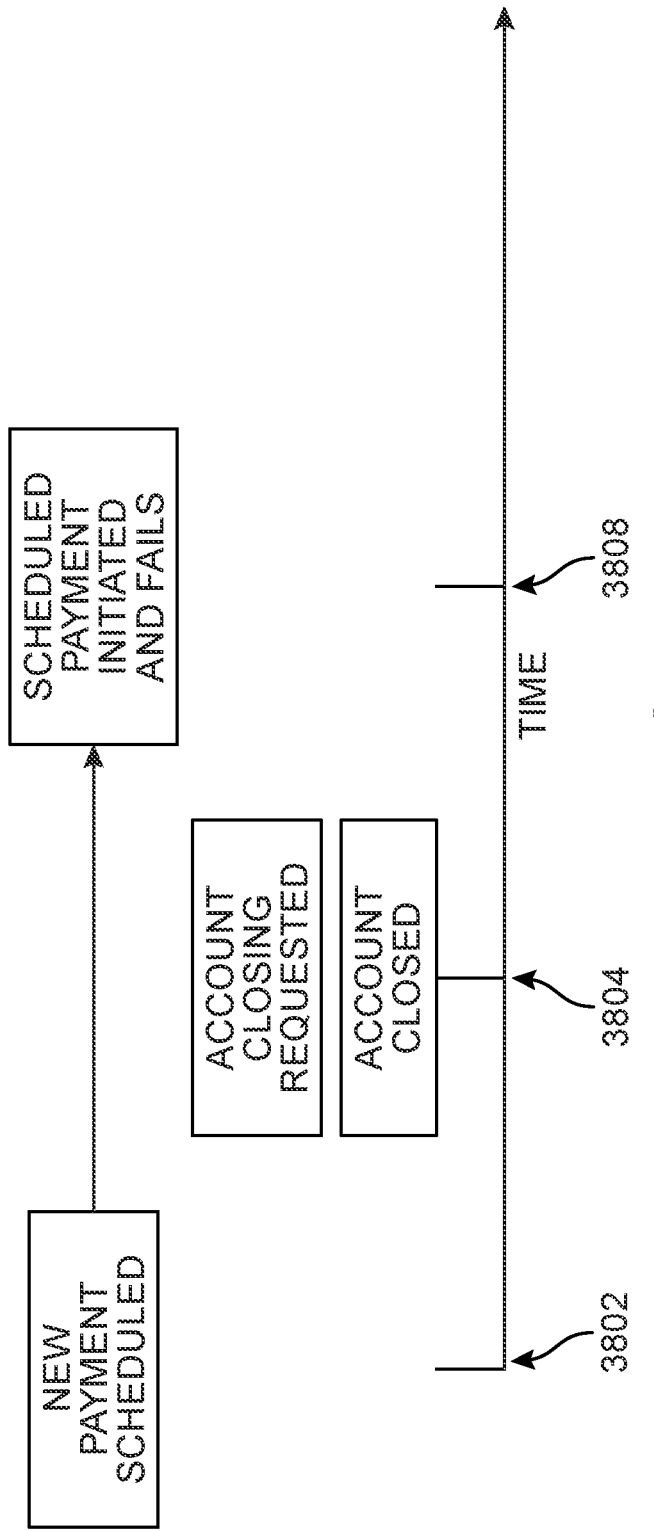
FIG. 38 is a chart illustrating a sequence of actions around the closing of an account using a system with a first architecture, according to an embodiment.

FIG. 38 depicts an example of an account closing sequence using a system that does not provide data enrichment in real time. Referring to FIG. 38, a new payment is scheduled at a first time 3802. At a later time 3804, an account closing request is received by an account management system and the account is closed. At a time 3808, which occurs after time 3804, the scheduled payment is initiated. Because the account has already been closed, the payment fails. In some cases, the original account owner may be charged fees for the failed payment.

Figure 39:
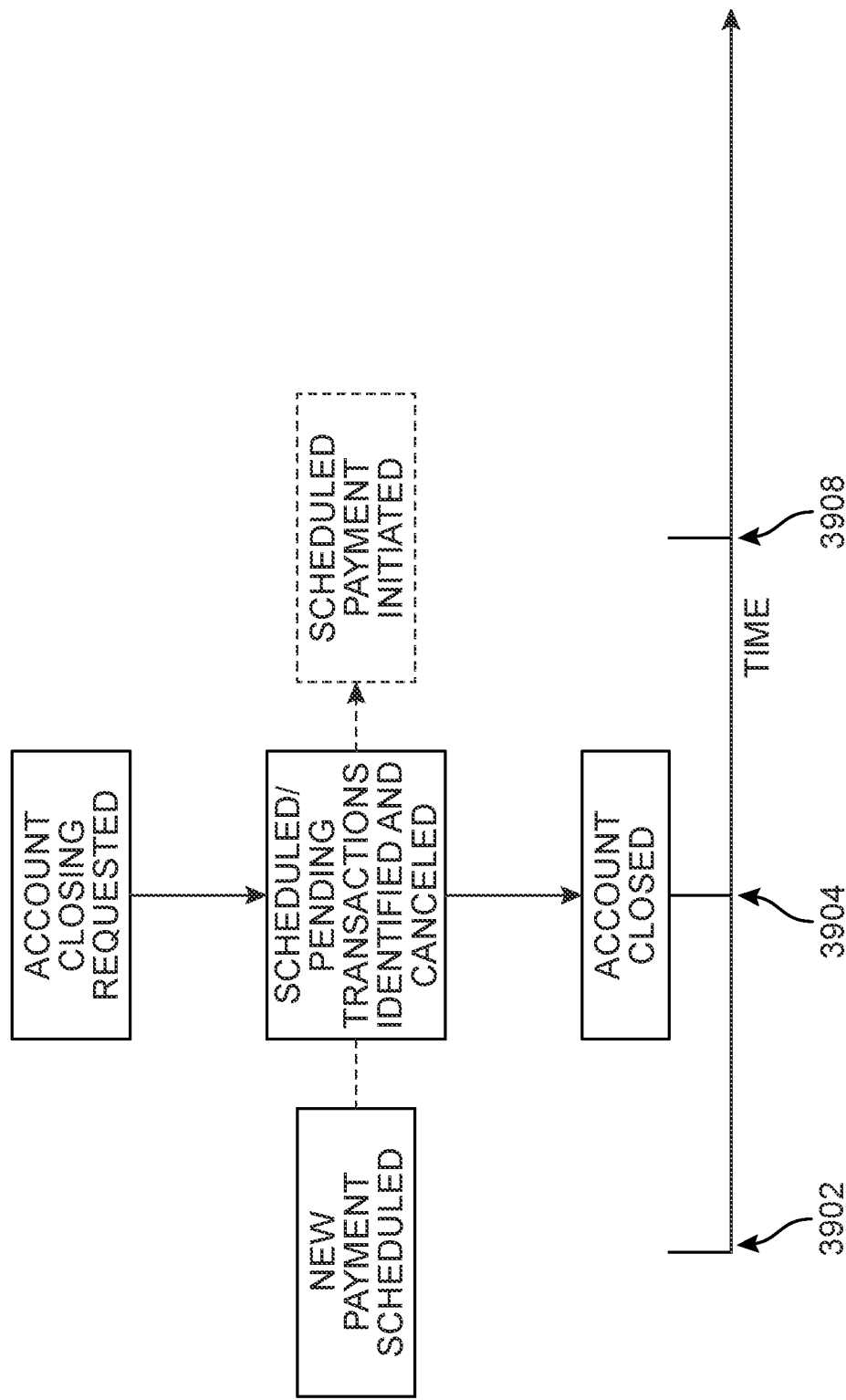
FIG. 39 is a chart illustrating a sequence of actions around the closing of an account using a another system with an event drive architecture, according to an embodiment.

FIG. 39 depicts an example of an account closing sequence using an event driven system with real-time enriched data. Referring to FIG. 39, a new payment is scheduled at a time 3902. At a later time 3904, an account closing request is received by an account management system. In response to this request, the account management system retrieves a real time list of scheduled/pending transactions and cancels them using information retrieved from the enriched transaction data. This prevents the payment scheduled at time 3902 from being initiated and processed at a later time 3906.

Figure 40:
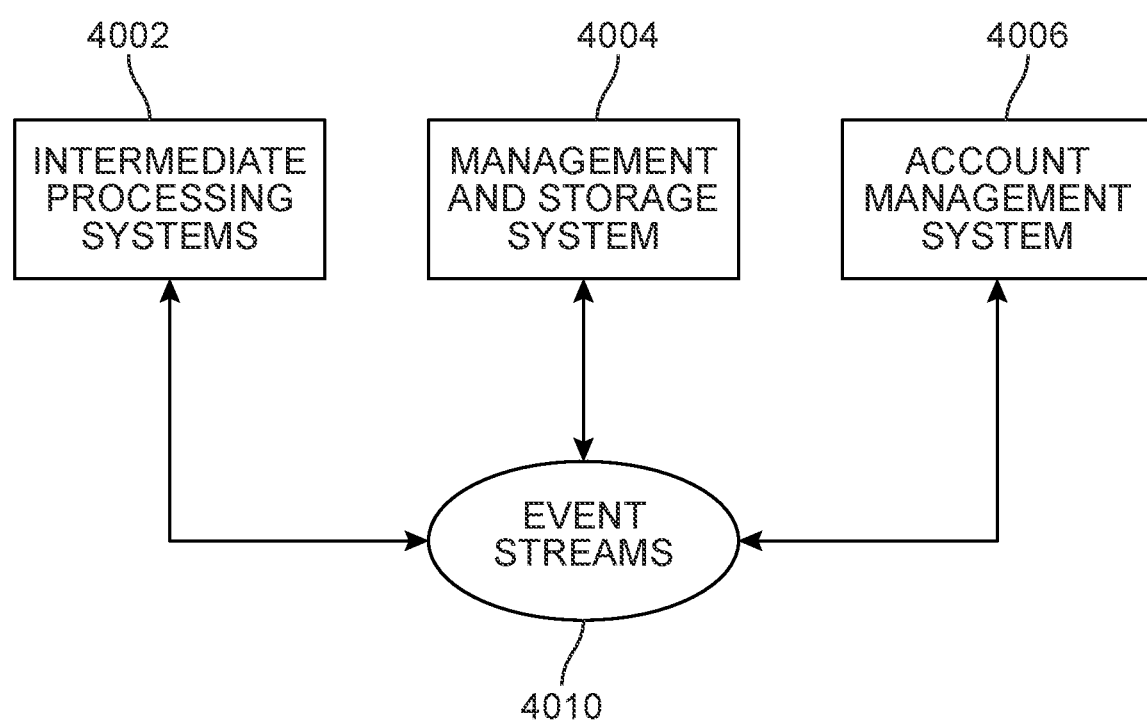
FIG. 40 is a schematic view of several systems that can communicate using an event stream, according to an embodiment.
Figure 41:
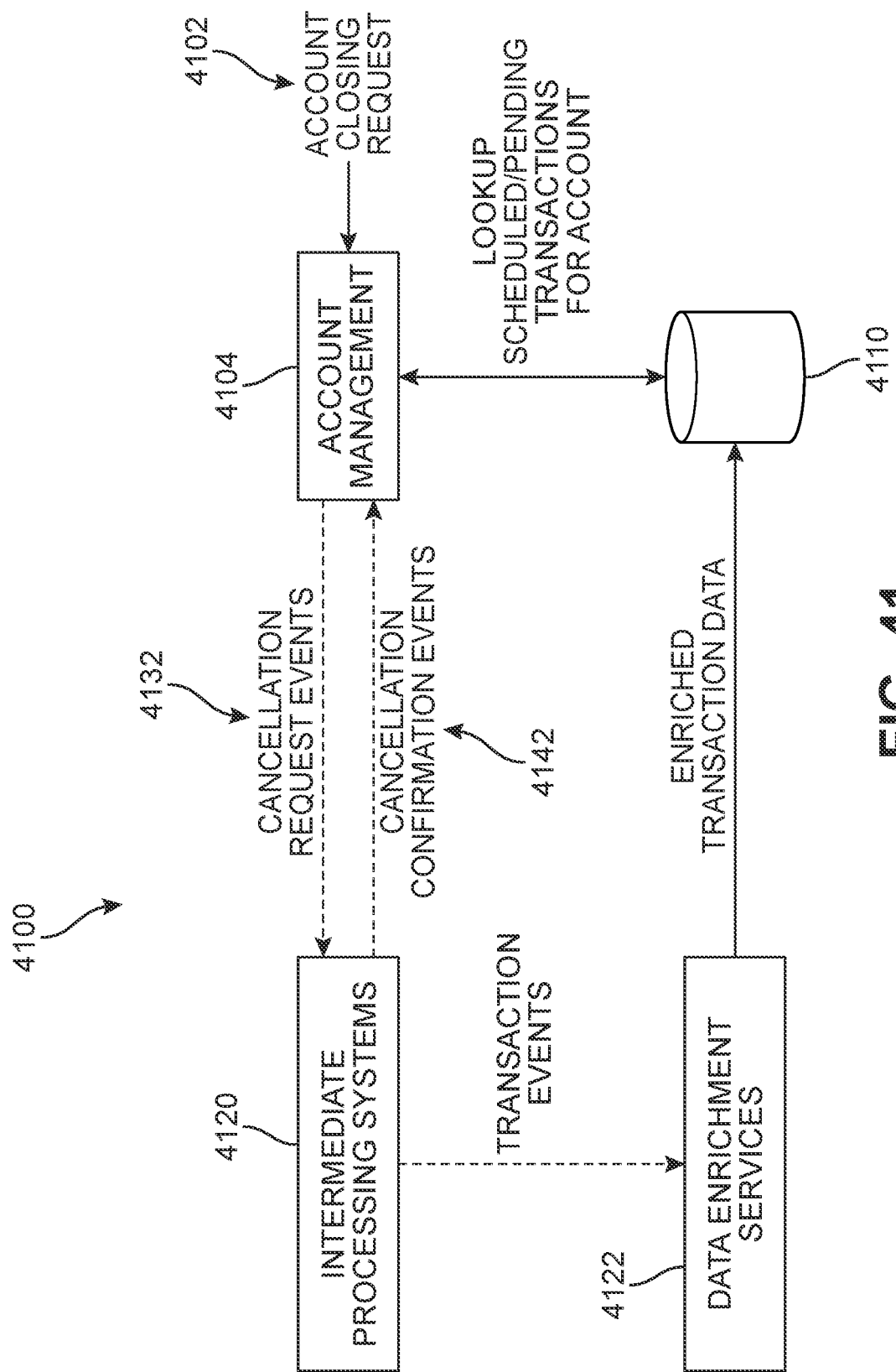
FIG. 41 is a schematic view of an account management system that can publish transaction cancellation request events and receive transaction cancellation confirmation events, according to an embodiment.

FIGS. 40-41 depict schematic views of an embodiment of a system where an account management system can publish events to an event stream so that these events may be consumed by other components. As seen in FIG. 40, financial transaction processing systems 4002, management and storage systems 4004, and account management system 4006 may all consume messages from one or more event streams 4010. Additionally, each of these systems may publish events to one or more events streams 4010. That is, each of these systems may be configured with event listeners and event producers, as in the examples shown in FIG. 6.

FIG. 41 depicts a schematic view of an event driven architecture 4100 where account management system 4104 can publish events to one or more event streams. As with the architecture depicted in FIG. 37, financial transaction processing systems 4120 may publish transaction events to data enrichment services 4122. Enriched transaction data is then placed in a datastore 4110. Upon receiving an account closing request 4102, account management system 4104 can look up scheduled/pending transactions for the account to be closed.

As seen in FIG. 41, account management system 4104 can also publish transaction cancellation request events 4132 to an event stream. These events can then be consumed by, for example, financial transaction processing systems 4120. The architecture provides a way for account management system 4104 to instruct financial transaction processing systems 4120 to cancel scheduled/pending transactions by publishing messages to the event stream. In response to request cancellation events, the financial transaction processing systems 4120 may cancel transactions. Processing systems 4120 may further publish cancellation confirmation events 4142 so that account management system 4104 can confirm that transactions have been canceled.

The event driven architecture described above may facilitate notifications that allow customers to be informed about transaction cancellations in real time. Such notifications could be useful for customers so that they can provide alternative forms of payment to a vendor without incurring additional fees for canceled payments.

Figure 42:
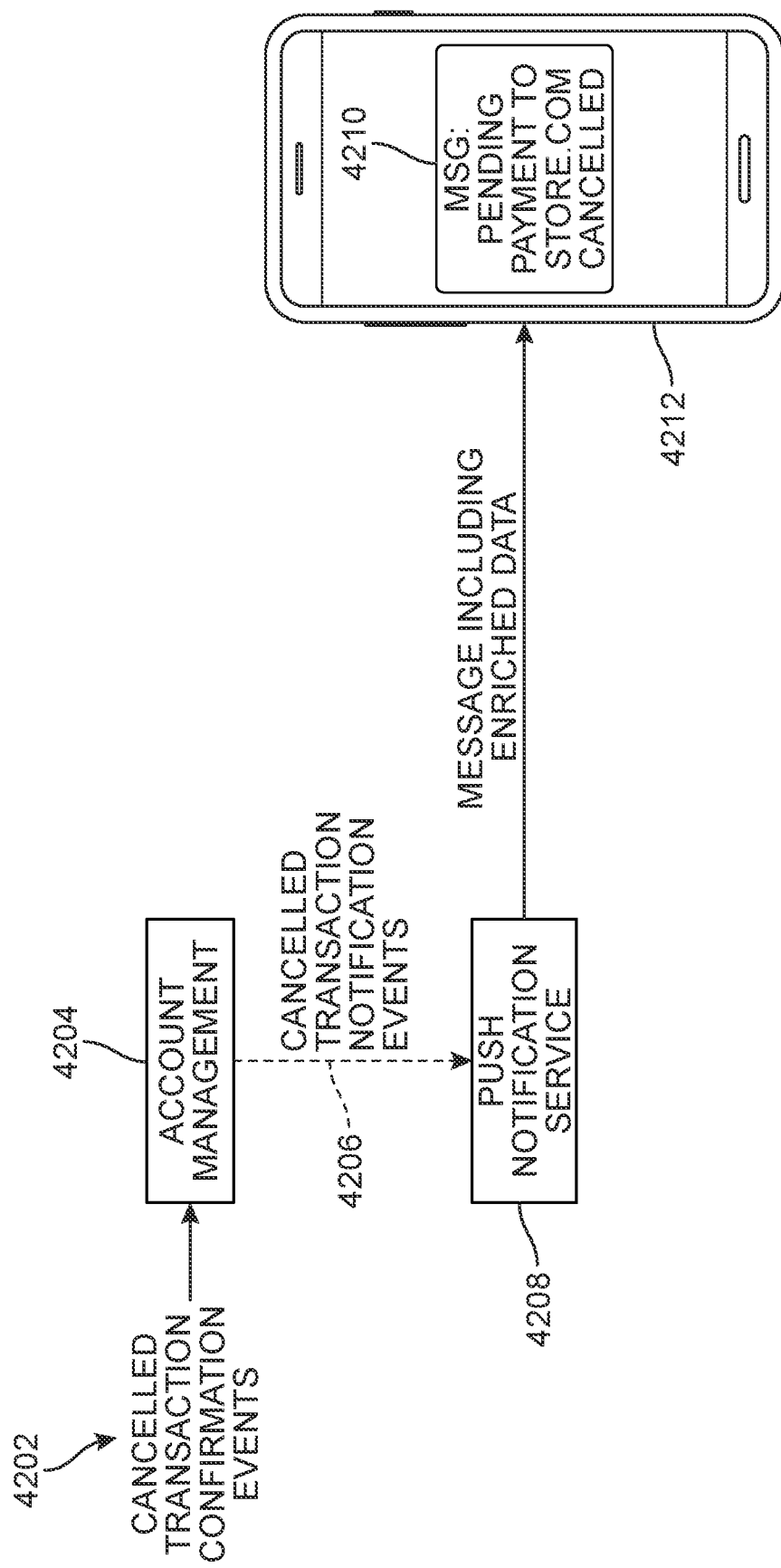
FIG. 42 is a schematic view of a system for pushing canceled transaction notifications in response to canceled transaction notification events, according to an embodiment.

FIG. 42 is a schematic view of a process for notifying customers about canceled payments in real time. In the example depicted in FIG. 42, new cancelled transaction confirmation events 4202 are received at account management system 4204. In response to these events, account management system publishes canceled transaction notification events 4206 to an event stream. These events are consumed by push notification service 4208. Upon canceled transaction notification events 4206, push notification service 4208 may send a message 4210 including enriched data to a user device 4212. In this case, the message includes information about vendor where the payment was initiated. The user then has the option to provide the vendor with an alternative form of payment.

Similarly, the embodiments can enable swapping credit or debit cards for a customer when the credit or debit card is compromised. Specifically, enriched information for scheduled and pending transactions that have been published to an event stream can be used to determine the originating sources (for example, a merchant identification name/number) for all transactions associated with a particular credit or debit card. This allows all scheduled and pending transactions associated with a specific credit or debit card to be immediately canceled prior to swapping the credit or debit card out with a new card.

The processes and methods of the embodiments described in this detailed description and shown in the figures can be implemented using any kind of computing system having one or more central processing units (CPUs) and/or graphics processing units (GPUs). The processes and methods of the embodiments could also be implemented using special purpose circuitry such as an application specific integrated circuit (ASIC). The processes and methods of the embodiments may also be implemented on computing systems including read only memory (ROM) and/or random access memory (RAM), which may be connected to one or more processing units. Examples of computing systems and devices include, but are not limited to: servers, cellular phones, smart phones, tablet computers, notebook computers, e-book readers, laptop or desktop computers, all-in-one computers, as well as various kinds of digital media players.

The processes and methods of the embodiments can be stored as instructions and/or data on non-transitory computer-readable media. The non-transitory computer readable medium may include any suitable computer readable medium, such as a memory, such as RAM, ROM, flash memory, or any other type of memory known in the art. In some embodiments, the non-transitory computer readable medium may include, for example, an electronic storage device, a magnetic storage device, an optical storage device, an electromagnetic storage device, a semiconductor storage device, or any suitable combination of such devices. More specific examples of the non-transitory computer readable medium may include a portable computer diskette, a floppy disk, a hard disk, magnetic disks or tapes, a read-only memory (ROM), a random access memory (RAM), a static random access memory (SRAM), a portable compact disc read-only memory (CD-ROM), an erasable programmable read-only memory (EPROM or Flash memory), electrically erasable programmable read-only memories (EEPROM), a digital versatile disk (DVD and DVD-ROM), a memory stick, other kinds of solid state drives, and any suitable combination of these exemplary media. A non-transitory computer readable medium, as used herein, is not to be construed as being transitory signals, such as radio waves or other freely propagating electromagnetic waves, electromagnetic waves propagating through a waveguide or other transmission media (e.g., light pulses passing through a fiber-optic cable), or electrical signals transmitted through a wire.

Instructions stored on the non-transitory computer readable medium for carrying out operations of the present invention may be instruction-set-architecture (ISA) instructions, assembler instructions, machine instructions, machine dependent instructions, microcode, firmware instructions, configuration data for integrated circuitry, state-setting data, or source code or object code written in any of one or more programming languages, including an object oriented programming language such as Smalltalk, $C_{++}$, or suitable language, and procedural programming languages, such as the "C" programming language or similar programming languages.

Aspects of the present disclosure are described in association with figures illustrating flowcharts and/or block diagrams of methods, apparatus (systems), and computing products. It will be understood that each block of the flowcharts and/or block diagrams can be implemented by computer readable instructions. The flowcharts and block diagrams in the figures illustrate the architecture, functionality, and operation of possible implementations of various disclosed embodiments. Accordingly, each block in the flowchart or block diagrams may represent a module, segment, or portion of instructions. In some implementations, the functions set forth in the figures and claims may occur in an alternative order than listed and/or illustrated.

The embodiments may utilize any kind of network for communication between separate computing systems. A network can comprise any combination of local area networks (LANs) and/or wide area networks (WANs), using both wired and wireless communication systems. A network may use various known communications technologies and/or protocols.

Communication technologies can include, but are not limited to: Ethernet, 802.11, worldwide interoperability for microwave access (WiMAX), mobile broadband (such as CDMA, and LTE), digital subscriber line (DSL), cable internet access, satellite broadband, wireless ISP, fiber optic internet, as well as other wired and wireless technologies. Networking protocols used on a network may include transmission control protocol/Internet protocol (TCP/IP), multiprotocol label switching (MPLS), User Datagram Protocol (UDP), hypertext transport protocol (HTTP), hypertext transport protocol secure (HTTPS) and file transfer protocol (FTP) as well as other protocols.

Data exchanged over a network may be represented using technologies and/or formats including hypertext markup language (HTML), extensible markup language (XML), Atom, JavaScript Object Notation (JSON), YAML, as well as other data exchange formats. In addition, information transferred over a network can be encrypted using conventional encryption technologies such as secure sockets layer (SSL), transport layer security (TLS), and Internet Protocol security (Ipsec).

While various embodiments of the invention have been described, the description is intended to be exemplary, rather than limiting, and it will be apparent to those of ordinary skill in the art that many more embodiments and implementations are possible that are within the scope of the invention. Accordingly, the invention is not to be restricted except in light of the attached claims and their equivalents. Also, various modifications and changes may be made within the scope of the attached claims.

We claim:

1. A method of detecting fraudulent activity, comprising:
listening for transaction events published to an event stream;
detecting the transaction events for a financial transaction, the transaction events being associated with transaction data;
sending a request to enrich the transaction data, the transaction data originally including raw data, the enriching occurring after detection of the transaction events and being performed by a data enrichment Application Programming Interface;
wherein the enriched transaction data is converted from a raw format into an enriched format by being cleaned by removing simple errors and applying a consistent format and by being categorized;
wherein the enriching reduces false positives by cleaning the transaction data and aids in identifying differences between groups of fraudulent and valid data by categorizing the transaction data;
receiving enriched transaction data;
reconciling scheduled and pending transactions using a reconciliation Application Programming Interface to find completed and expired transactions for use when detecting fraudulent activity;
aggregating, by a data aggregator, enriched manual and scheduled transaction data from a financial transaction processing system and enriched pending and processed transaction data for use when detecting fraudulent activity;
wherein the aggregating facilitates access to the enriched transaction data by improving organization and reliability of the enriched transaction data;
analyzing the enriched transaction data; and
detecting fraudulent activity using fraud detection algorithms that provide improved fraud detection based on the enriching, the reconciling, and the aggregating,
wherein the fraud detection algorithms detect fraudulent activity using a trained model, and the trained model is a neural network.

2. The method according to claim 1, wherein the fraud detection algorithms include at least one of clustering and classification techniques, time series analyses, and anomaly detection techniques.

3. The method according to claim 1, wherein the financial transaction processing system temporarily stores transaction data in a database.

4. The method according to claim 3, wherein the financial transaction processing system persistently stores transaction data in a long term storage.

5. The method according to claim 4, wherein enriched pending transaction data is stored in the long term storage and wherein enriched scheduled transaction data is stored in the datastore.

6. The method according to claim 1, wherein the method further includes a step of posting the financial transaction, and wherein the step of posting the financial transaction occurs after the step of detecting fraudulent activity.

7. The method according to claim 1, further comprising sending a fraud notification to a device associated with a customer for a financial account, the fraud notification including information from the enriched transaction data.

8. The method according to claim 7, further comprising receiving a response to the fraud notification from the customer.

9. The method according to claim 1, further comprising interfacing with a data enrichment service through the data enrichment Application Programming Interface.

10. The method according to claim 1, further comprising generating a transaction record storing the enriched transaction data.

11. The method according to claim 10, further comprising making the transaction record available for receiving a query from a customer for a financial account.

12. A system for detecting fraudulent activity, comprising:
a financial transaction processing system configured to:
listen for transaction events published to an event stream;
detect the transaction events for a financial transaction, the transaction events being associated with transaction data;
send a request to enrich the transaction data, the transaction data originally including raw data, the enriching occurring after detection of the transaction events and being performed by a data enrichment Application Programming Interface;
wherein the enriched transaction data is converted from a raw format into an enriched format by being cleaned by removing simple errors and applying a consistent format and by being categorized;
wherein the enriching reduces false positives by cleaning the transaction data and aids in identifying differences between groups of fraudulent and valid data by categorizing the transaction data; and a management and storage system configured to:
receive the enriched transaction data;
persist the enriched transaction data in a long term storage of the management and storage system; and
reconcile scheduled and pending transactions using a reconciliation Application Programming Interface; and a fraud detection system configured to:
receive the enriched transaction data;
aggregate, by a data aggregator, enriched manual and scheduled transaction data from the financial transaction processing system and enriched pending and processed transaction data for use when detecting fraudulent activity;
wherein the aggregating facilitates access to the enriched transaction data by improving organization and reliability of the enriched transaction data; and
analyze the enriched transaction data to detect fraudulent activity using fraud detection algorithms that provide improved fraud detection based on the enriching and the reconciling,
wherein the fraud detection algorithms detect fraudulent activity using a trained model, and the trained model is a neural network.

13. The system according to claim 12, wherein the fraud detection algorithms include at least one of clustering and classification techniques, time series analyses, and anomaly detection techniques.

14. The system according to claim 12, wherein the management and storage system comprises:
a transaction service configured to publish the enriched manual and scheduled transaction data; and
a middleware system configured to store the enriched pending and processed transaction data.

15. The system according to claim 14, wherein the the transaction service is configured to alert the middleware system about newly enriched data.

16. The system according to claim 14, wherein the transaction service comprises the data enrichment Application Programming Interface which interfaces with a data enrichment service.

17. The system according to claim 12, wherein the management and storage system is configured to publish processed complete transaction events and processed expired transaction events.

18. The system according to claim 12, wherein the financial transaction processing system includes a datastore configured to temporarily store transaction data.

19. The system according to claim 18, wherein wherein the financial transaction processing system includes the long term storage configured to persistently store transaction data.

20. The system according to claim 19, wherein enriched pending transaction data is stored in the long term storage and wherein enriched scheduled transaction data is stored in the datastore.

* * * * *